United States Patent
Barrett

(10) Patent No.: US 9,587,722 B2
(45) Date of Patent: Mar. 7, 2017

(54) PIVOTING ARM FOR KINETIC ENERGY GENERATION DEVICE AND METHODS OF USING SAME

(71) Applicant: Kevin M. Barrett, Rancho Santa Fe, CA (US)

(72) Inventor: Kevin M. Barrett, Rancho Santa Fe, CA (US)

(*) Notice: Subject to any disclaimer, the term of this patent is extended or adjusted under 35 U.S.C. 154(b) by 25 days.

(21) Appl. No.: 14/817,108

(22) Filed: Aug. 3, 2015

(65) Prior Publication Data

US 2016/0123439 A1 May 5, 2016

Related U.S. Application Data

(60) Provisional application No. 62/032,170, filed on Aug. 1, 2014.

(51) Int. Cl.
| | |
|---|---|
| *F16H 19/02* | (2006.01) |
| *F03B 13/18* | (2006.01) |
| *F03D 5/06* | (2006.01) |

(52) U.S. Cl.
CPC .......... *F16H 19/02* (2013.01); *F03B 13/182* (2013.01); *F03D 5/06* (2013.01); *F05B 2210/16* (2013.01)

(58) Field of Classification Search
CPC .......... F16H 19/02; F03D 5/06; F03B 13/182
USPC .......... 290/1 C, 1 R, 42, 43, 53, 54, 44, 55
See application file for complete search history.

(56) References Cited

U.S. PATENT DOCUMENTS

| | | | | |
|---|---|---|---|---|
| 7,245,041 B1* | 7/2007 | Olson | ................. | F03B 13/1885 290/42 |
| 8,276,377 B2* | 10/2012 | Patton | ................. | F03B 13/1865 290/42 |
| 8,310,079 B2* | 11/2012 | Kingston | .............. | F03B 13/264 290/43 |
| 2006/0232074 A1* | 10/2006 | Chiasson | ............ | F03B 13/1815 290/53 |
| 2008/0048455 A1* | 2/2008 | Carney | ..................... | F03D 5/00 290/54 |
| 2008/0191485 A1* | 8/2008 | Whittaker | ............. | F03B 13/182 290/53 |
| 2009/0224553 A1* | 9/2009 | Williams | .................. | F03D 5/06 290/55 |
| 2010/0034670 A1* | 2/2010 | Smith | ................... | F03B 13/187 417/53 |

(Continued)

*Primary Examiner* — Viet Nguyen
(74) *Attorney, Agent, or Firm* — Procopio Cory Hargreaves and Savitch LLP

(57) ABSTRACT

A device is provided that converts random movement of extrinsic oscillation into purposeful movement, such as torque or other motion that can be used to generate electricity. This device may include but is not limited to two major components: 1) a collection unit and 2) a transmission unit. The collection unit represents the interactive part of the device that interfaces with an extrinsic body which provides the randomized kinetic motion that drives an articulating arm, and may include a series of connected pivoting arms of different lengths. The transmission unit is the portion of the device that converts the random motion of the articulating arm into unidirectional rotation of a shaft that is converted into purposeful torque. The device may be placed in almost any type of environment to take advantage of any type of kinetic motion, including water, wind, mechanical movement and even human movement.

14 Claims, 21 Drawing Sheets

(56) References Cited

U.S. PATENT DOCUMENTS

| | | | | |
|---|---|---|---|---|
| 2010/0140944 A1* | 6/2010 | Gardiner | F03B 13/16 | 290/53 |
| 2012/0235413 A1* | 9/2012 | Piccinini | F03B 13/1865 | 290/53 |
| 2012/0235417 A1* | 9/2012 | Arntz | F03D 5/00 | 290/55 |
| 2012/0292915 A1* | 11/2012 | Moon | F01D 5/00 | 290/55 |
| 2013/0009402 A1* | 1/2013 | Williams | F03B 13/182 | 290/53 |
| 2013/0113215 A1* | 5/2013 | Corcoran | F03B 13/1805 | 290/54 |
| 2013/0127168 A1* | 5/2013 | Dragic | F03B 13/1855 | 290/53 |
| 2013/0200626 A1* | 8/2013 | Sidenmark | F03B 13/1885 | 290/53 |
| 2014/0070543 A1* | 3/2014 | Massimo | F03G 3/00 | 290/1 R |
| 2014/0097617 A1* | 4/2014 | Rohrer | F03B 13/182 | 290/42 |
| 2014/0217736 A1* | 8/2014 | Peng | F03B 13/1815 | 290/53 |
| 2014/0239642 A1* | 8/2014 | Peng | F03B 13/1815 | 290/53 |
| 2014/0375058 A1* | 12/2014 | Chan | F03B 13/20 | 290/53 |
| 2015/0021918 A1* | 1/2015 | Greco | F03B 13/1815 | 290/53 |

\* cited by examiner

PIVOTING ARM FOR KINETIC ENERGY GENERATION DEVICE AND METHODS OF USING SAME

BACKGROUND

Field of the Invention

Devices and methods provided herein relate generally to devices that convert kinetic energy into electricity, and more particularly to pivoting arms that convert random movement of extrinsic oscillation into purposeful movement that can be used to generate electricity, and various methods for their use.

Related Art

In recent years, there has been a substantial influx in the 'green energy' market related to devices and methods for producing energy from fuel sources other than fossil fuels. The burning of fossil fuels has been the convention for providing both mechanical energy as well as electrical energy. In particular, many large scale electric generators use the burning of fossil fuels to create and convert mechanical energy to electrical energy. The reliance on fossil fuels in both large and small scale applications, is driving a depletion of many conventional fossil fuel sources, and may soon be unsustainable to meet our large energy demands. It is also a widely held belief among scientists that the burning of these fossil fuels is adding to climate change. As a result, we believe that now is the time for innovation in energy production devices and methods which employ sustainable alternative fuel sources.

Conventional alternative energy devices known today include wind turbines, solar cells, geothermal and hydro-electric generators and others. These innovations have provided a huge step toward the long term goal of cutting our reliance on fossil fuels, however, they have many drawbacks. These methods can be costly, both in monetary terms and in the energy consumption required to manufacture them. A wind turbine or solar farm typically costs millions of dollars to build, install, and maintain and are often deemed unsightly. In addition, the unpredictability of wind and weather can cause these units to go unused for quite some time. Hydro-electric plants rely on the proximity of a water source and the building of a dam which can be destructive to the local habitat.

Harvesting natural resources and developing sustainable energy sources that provide viable alternatives to fossil fuels calls for the creation of specialized devices. Therefore, it is desirable to develop devices which produce electricity without the limitations of fossil fuels and the inflexibility and unpredictability of current green energy sources.

SUMMARY

Embodiments described herein provide for a device that converts random movement of extrinsic oscillation into purposeful movement—such as torque or other motion—that can be used to generate electricity. This device may include but is not limited to two major components: 1) a collection unit, and 2) a transmission unit. The collection unit represents the interactive part of the device that interfaces with an extrinsic body (referred to herein as a Prime Mover) which provides the randomized kinetic motion that drives an articulating arm. The transmission unit is the portion of the device that converts the random motion of the articulating arm into purposeful torque.

Specifically, a device with the ability to capture and convert the random movement of an extrinsic body into purposeful motion, such as torque, that can, for example drive a generator shaft to produce electricity. The extrinsic body producing this movement may include numerous forms such as water, wind, human, animal, mechanical, or other bodies. The movement may include oscillation, rotation and/or vibration.

In one embodiment, the collection unit of the device interfaces with the Prime Mover to convert its motion into the movement of an articulating arm. This articulating arm (connected at one end to the collection unit and at the other end to the transmission) can move at the transmission end along x, y and z axes, or any compound angle of the three axes. The transmission then converts the articulating arm motion into unidirectional rotation of an output shaft which in turn spins a generator/alternator to produce electricity. Each of these components addresses disadvantages of existing devices in unique ways which will be illustrated and described throughout this document.

This unit provides a basis for future developments related to alternative power generation. Described below are embodiments relating to methods of use of the device; however, many additional applications and uses are possible. Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for a device that converts random movement of extrinsic oscillation into purposeful movement, such as torque or other motion that can be used to generate electricity. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Embodiments of this device include, but are in no way limited to, the following applications illustrated in the various figures herein, which correspond to potential locations for the device based on varying types of extrinsic bodies which can act upon the device to convert energy.

The resulting transmission can convert inconsistent, erratic or random movement of the articulating arm in any direction, left to right or right to left on the x-axis, as well as, top to bottom or bottom to top on the y-axis, as well as in to out or out to in on the z-axis or any combination of these angles of movement into unidirectional rotation of a drive shaft. There are many potential uses for this device, such as to spin a generator/alternator, flywheel, attach directly to a pump, or many other potential uses.

Additionally, the embodiments described herein are designed to be scalable to various sizes depending on their specific application and desired power generation. For example, a large device may be placed in a body of water to translate the movement of the body of water into a significant amount of power for industrial or commercial uses, while a portable device may be designed which simply scales down the device for attachment to a moving object—such as a vehicle or even a person—in order to generate smaller amounts of power for low power applications.

I. Underwater Application—Multiple Directions of Flow

Figure 1:
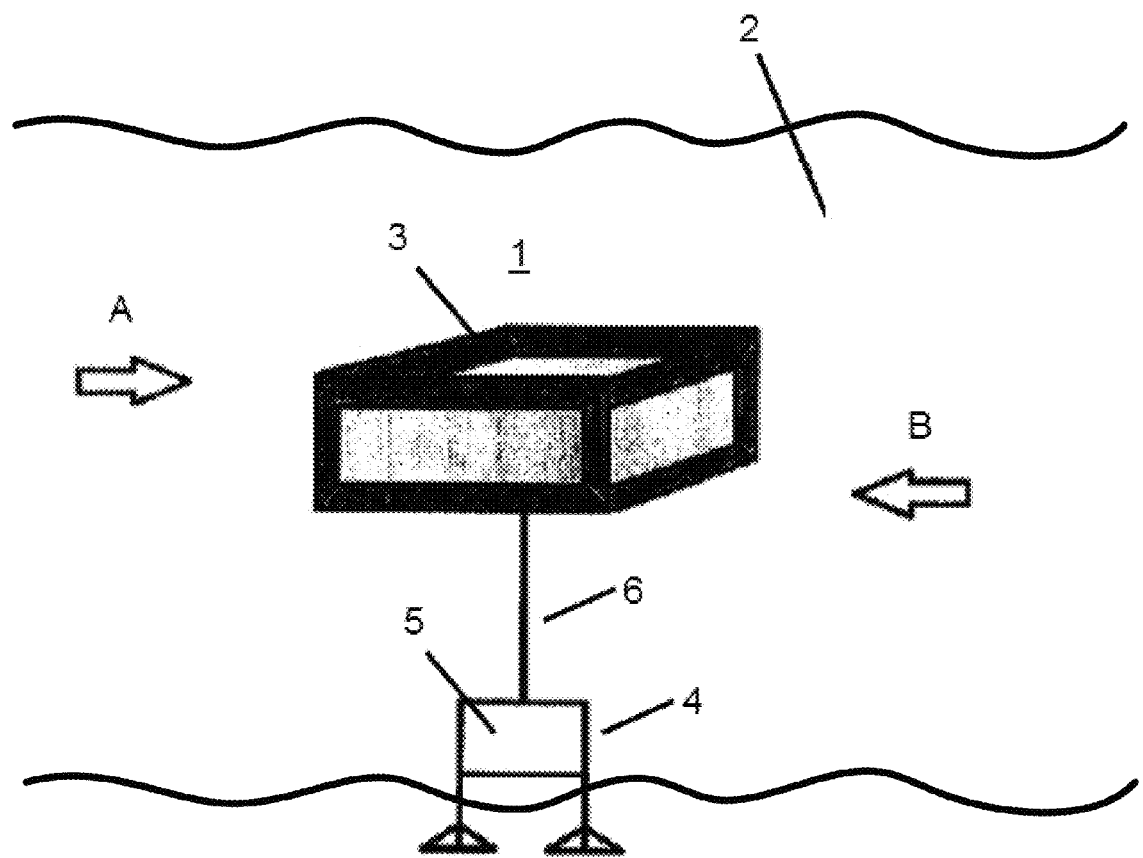
FIG. 1 is an illustration of an undersea collection unit, according to an embodiment of the invention.
Figure 2:
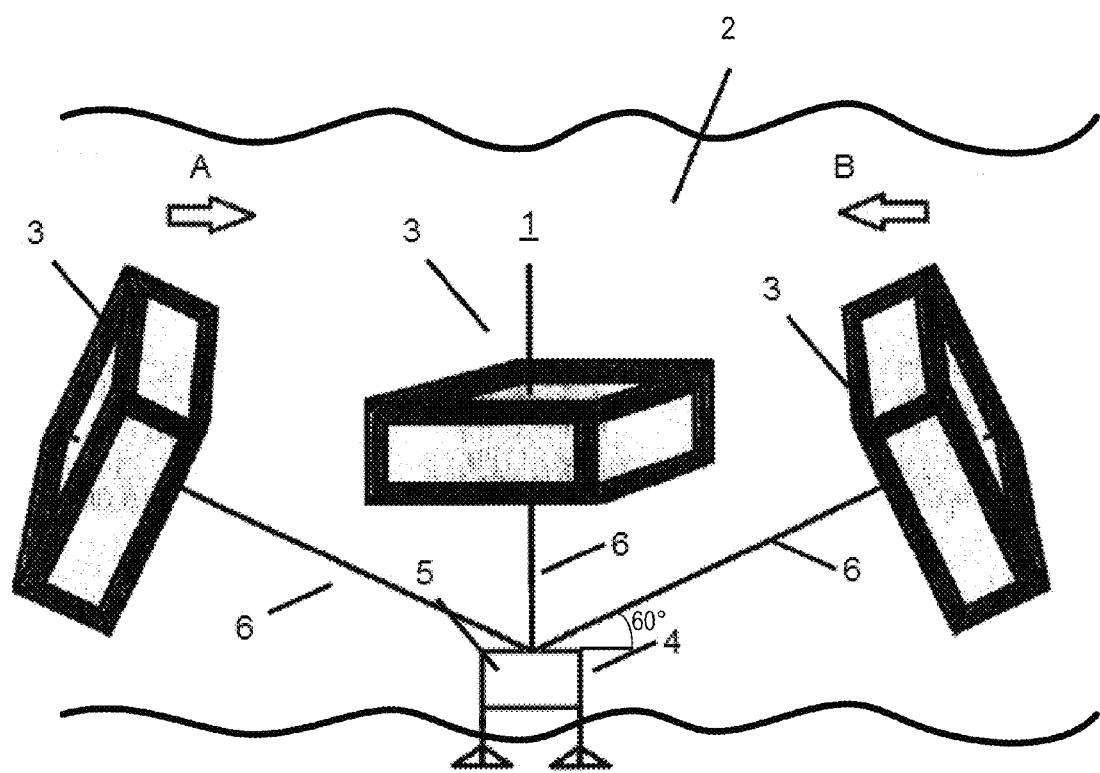
FIG. 2 illustrates a rotation of movement of the undersea collection unit, according to an embodiment of the invention.

FIG. 1 illustrates one embodiment of the device 1 in an underwater environment 2 where the movement of water occurs in multiple different directions, such as in the ocean or a large lake. A collection unit 3 is placed within the underwater environment 2 and secured to a substantially stationary body 4 via an articulating arm 6. The substantially stationary body 4 is attached to a floor of the body of water, and a transmission unit 5 is positioned below the collection unit within the stationary body. The back and forth, horizontal movement of the prime mover (ocean waves in this case), as illustrated by the directional arrows A and B pushing on the collection unit, will cause at least two types of movements, as illustrated in FIG. 2:

1) The pivoting of the articulating arm, such that at maximum pivot the flow is substantially parallel to the articulating arm and at the mid-point of a pivot is substantially orthogonal to the articulating arm, and 2) The compression and expansion of the distance between the collection unit (as it slides up and down the articulating arm) as it moves towards and away from the transmission.

These motions will provide the kinetic movement to the transmission to be converted.

The collection unit may take on one or more shapes and sizes configured to capture as much movement from the Prime Mover as possible. In one embodiment illustrated in FIG. 3, the collection unit is a "tesseract," or cube with fins. The tesseract contains multiple concave sides which will increase the amount of resistance caused by the water moving in almost any direction against it.

The average distance of the collection unit from the transmission can be varied based on conditions to optimize efficiency and/or safety. For example, each ocean wave transfers more energy and hence causes more movement of water closer to the surface than at the ocean floor. Therefor being able to move the collection unit closer to the surface will expose it to more movement and more energy. If conditions become too powerful for the device, the collection unit can be lowered down the articulating arm away from the surface to a less powerful environment closer to the ocean floor. NOTE: Maximum height may be determined by the length of the articulating arm and minimum height may be determined by the size of the collection unit and stationary body so as to avoid contact between the two.

In addition to distance adjustments of the collection unit along the articulating arm from the transmission to optimize efficiency and/or safety, the transmission and generator loads can also be geared/adjusted to optimize efficiency and safety e.g., In heavy conditions resistance can be increased by increasing loads or reducing gear sizes to increase rotation speeds and thereby extract more power from the waves. If the forces increase beyond safe levels these techniques can be used to reduce power production and prevent overloading or damage to the system.

II. Underwater Application—Single Direction of Flow

Figure 4:
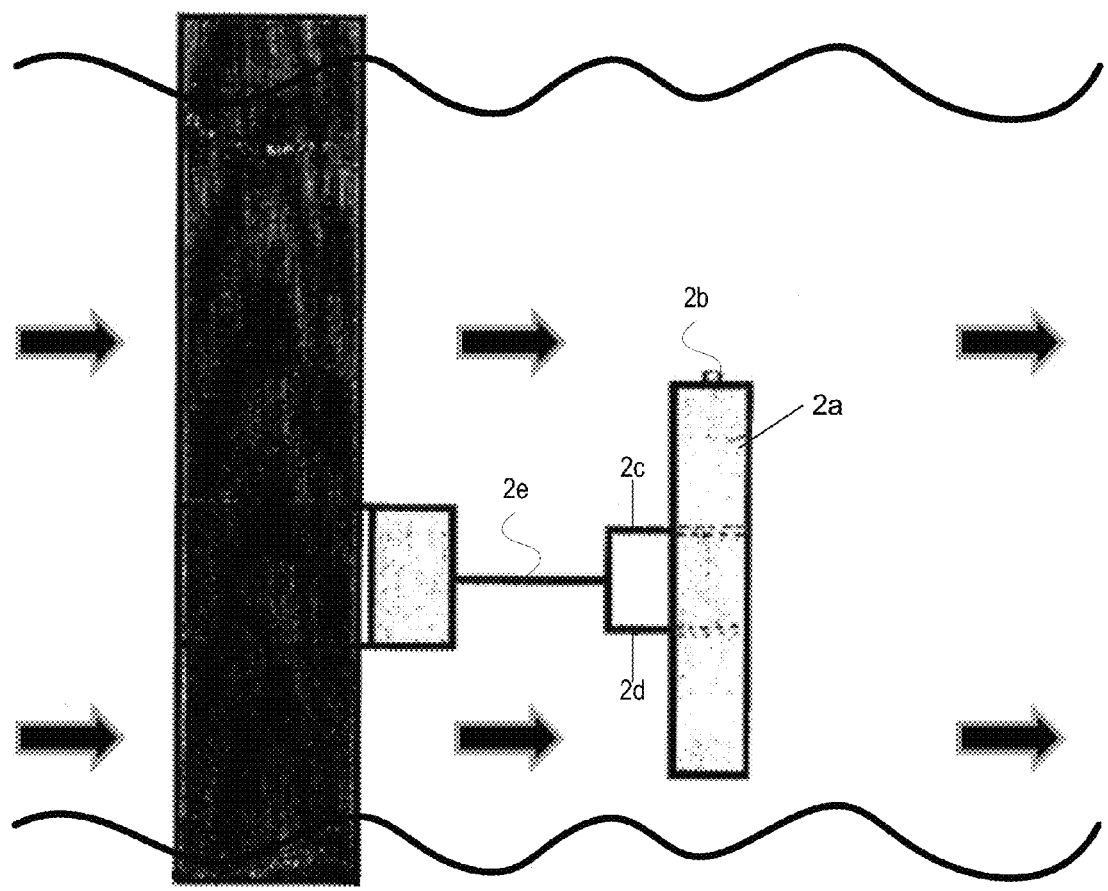
FIG. 4 is an illustration of a river collection unit, according to an embodiment of the invention.

FIG. 4 illustrates one embodiment of the device in an underwater environment where the Prime Mover (flow of water) moves in only one direction (as indicated by the directional arrow), such as a river, stream, irrigation channel, pipeline, etc. In one embodiment, the substantially stationery body may extend vertically from a floor of the body of water (e.g., a bridge pylon) and therefore perpendicular to the flow of water. The unit may be secured to a midpoint of the substantially stationary body such that the transmission is typically positioned horizontally and perpendicular to the collection unit. The movement of the Prime Mover is primarily in one direction (e.g. flowing river water) and is substantially parallel to an articulating arm connecting the collection unit with the transmission. In addition to the existing force of the flow of water, the turbulence produced downstream of the stationary body will produce additional kinetic movement available to be converted, as illustrated by the fluid flow diagrams in FIG. 6A and FIG. 6B.

Figure 5:
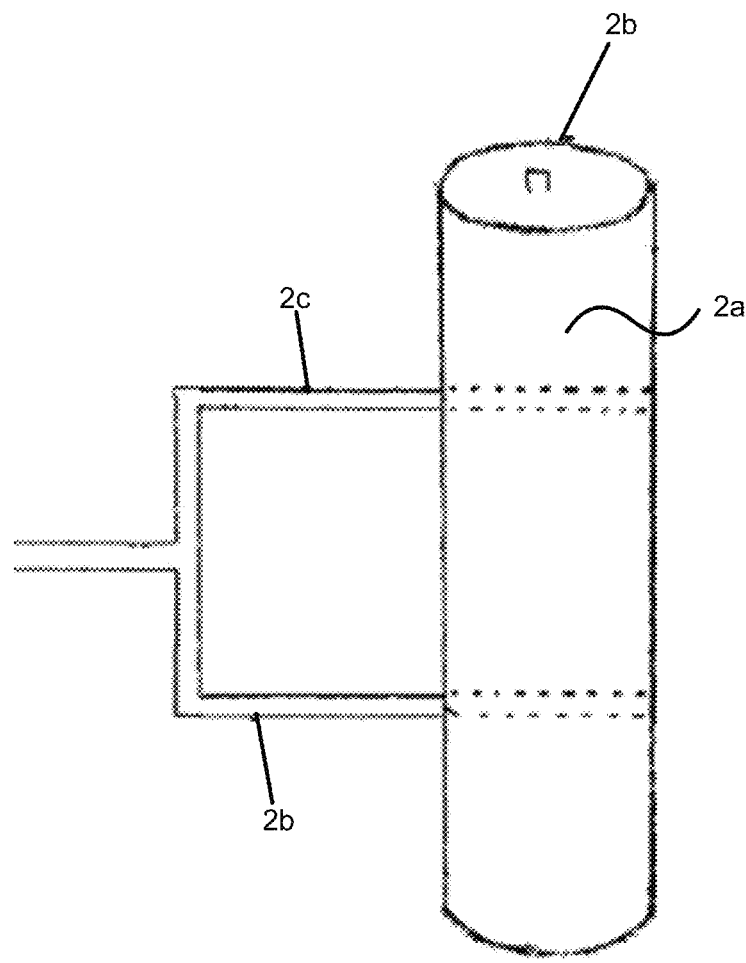
FIG. 5 illustrates a collection unit in the shape of a cylinder, according to one embodiment of the invention.

The collection unit may again take on various shapes and sizes. In one embodiment, the collection unit shape is similar to the shape of the vortexes produced in FIG. 6B which is a cylinder, as illustrated in FIG. 5. The distance of the collection unit from the transmission can be varied based on conditions to optimize efficiency and/or safety, and to provide a desired amount of horizontal movement. The transmission, generator can also be geared/adjusted to optimize efficiency and safety.

III. Portable Application—Omnidirectional Movement

Figure 7A:
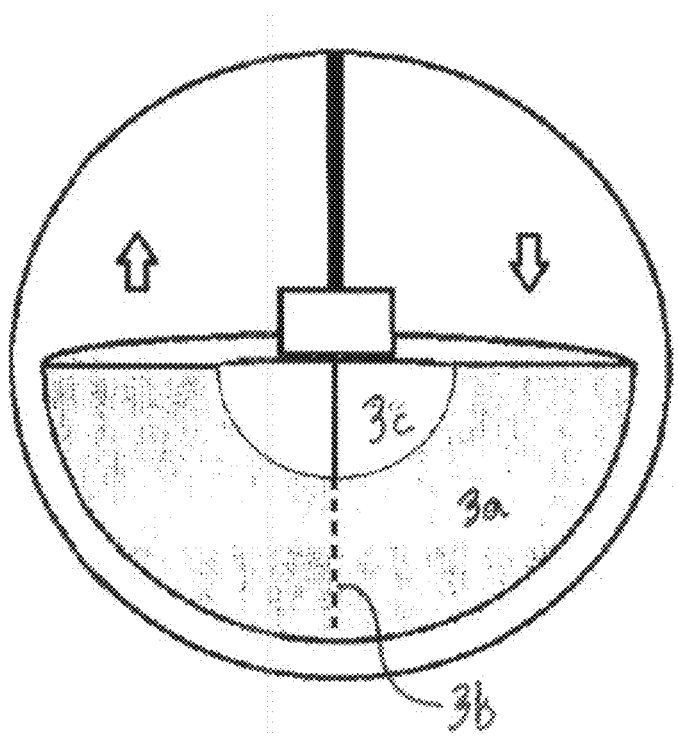
FIGS. 7A and 7B are illustrations of a portable collection and transmission unit, according to an embodiment of the invention.
Figure 7B:
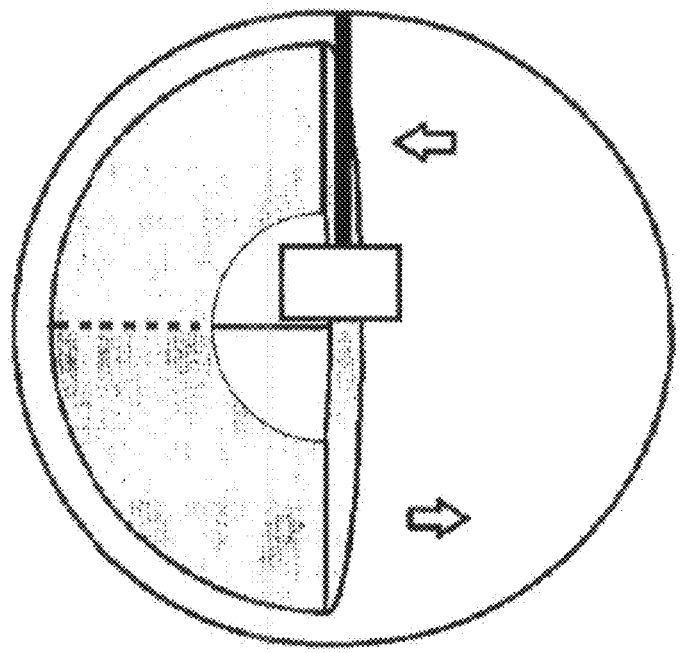

FIG. 7A and FIG. 7B illustrate one embodiment of an enclosed unit where the collection unit and transmission are completely enclosed within a housing. In this embodiment, the unit may be secured to or placed in the Prime Mover. The transmission is positioned above the collection unit (which in this case is a pendulum weight), whereby the whole unit moves with the prime mover. This movement will cause a relative swinging or vibration of the pendulum versus the transmission which will produce the kinetic movement to be converted. The collection unit may be many shapes. The preferred collection unit shape is a "Pendulum bowl." This is the shape of the weight depicted in FIGS. 7A and 7B.

The enclosed unit is therefore portable and capable of being mounted or placed in any location where it can be acted on by randomized kinetic energy to generate electrical energy. The distance of the collection unit from the transmission can be varied based on conditions to optimize efficiency and/or safety. The transmission and generator can also be geared/adjusted to optimize efficiency and safety.

IV. Attached Application—Omnidirectional Movement

Figure 8:
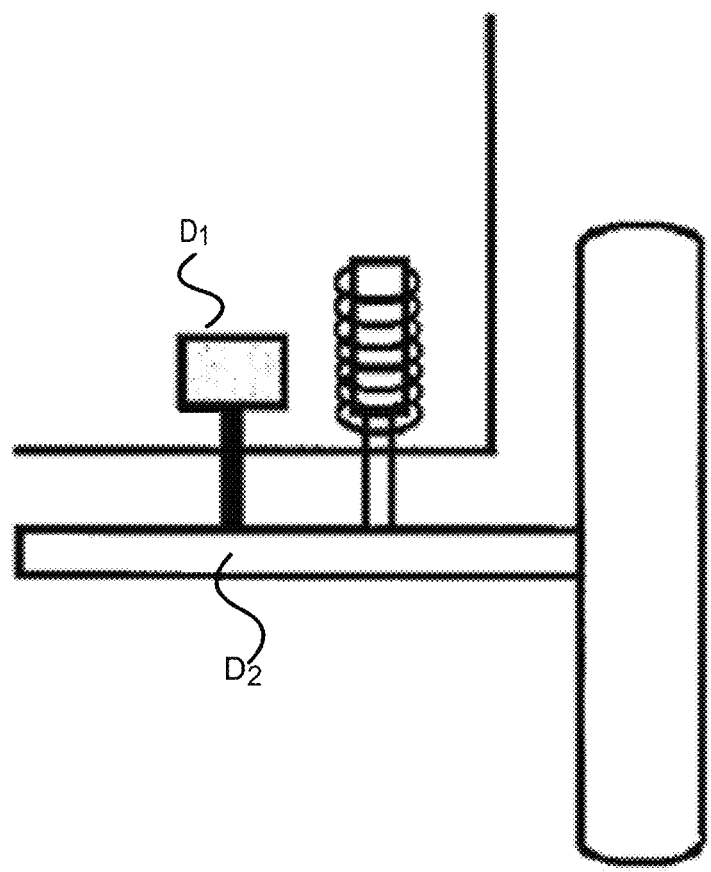
FIG. 8 illustrates the collection and transmission unit positioned between two parts of a prime mover; according to an embodiment of the invention.

Another embodiment illustrated in FIG. 8 shows how the unit may be secured to a Prime Mover (e.g., the chassis of a vehicle), and the transmission is positioned to attach the articulating arm to any other part of the Prime Mover (e.g., the vehicle axel) or any other object that will offer relative movement to the Prime Mover, as illustrated in FIG. 8. This relative motion will provide the kinetic energy to be converted. The length of the articulating arm can be varied based on conditions to optimize efficiency and/or safety. The transmission and generator can also be geared/adjusted to optimize efficiency and safety.

V. Collection Units

The collection units may be any shape or size, and be positioned in any one of a variety of environments. The distances, angles, weights and attachment points may be adjusted in order to optimize the conversion of randomized kinetic energy in the environment in which the device is placed. Non-limiting examples of several different collection units is provided below.

A. Tesseract

Figure 3:
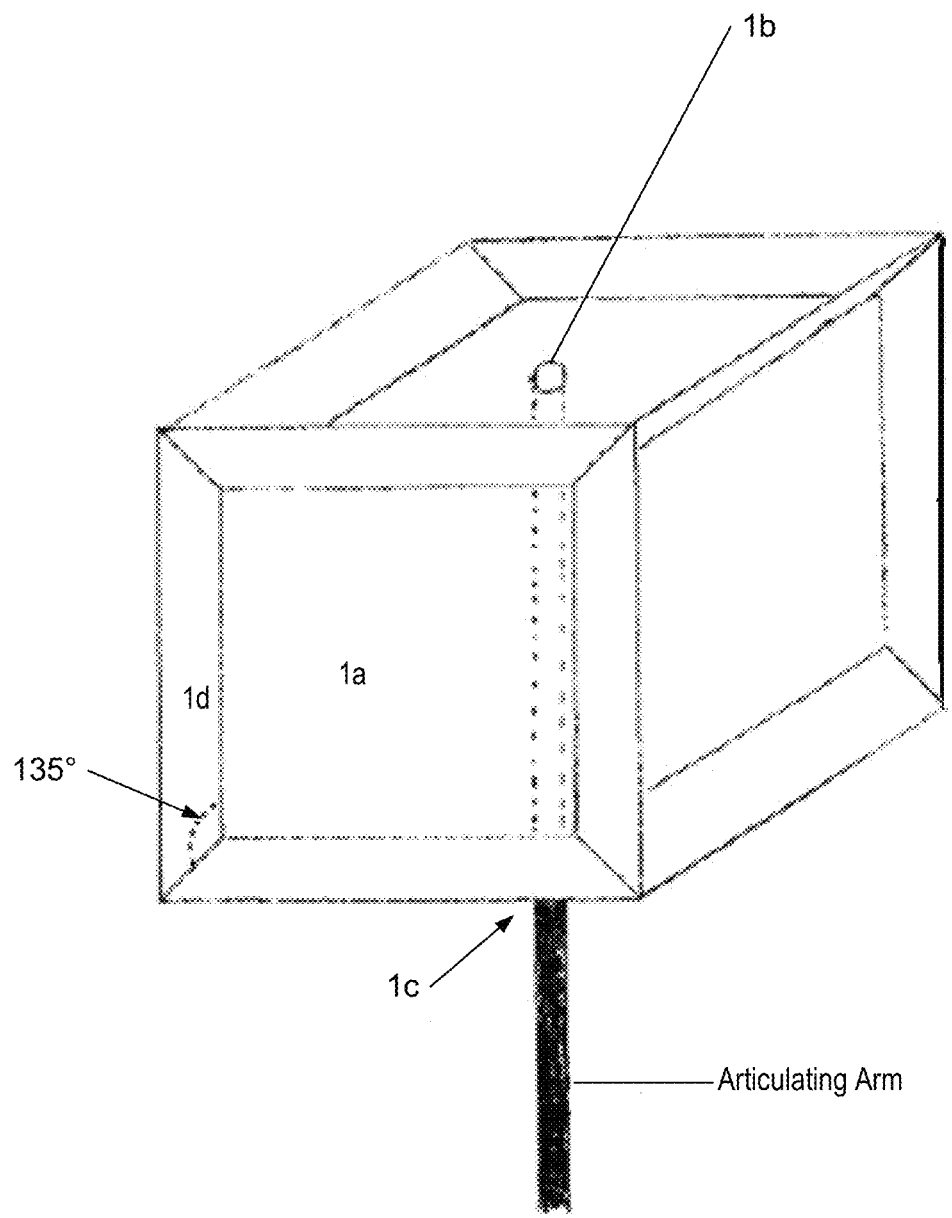
FIG. 3 illustrates a collection unit in the shape of a tesseract, according to one embodiment of the invention.

FIG. 3 illustrates one embodiment of a tesseract, which may include a sealed hollow central cube (1a) (note the cube may be rectangular or other geometric shape) with an internal core (1b) that allows the articulating arm to pass through it. This central cube provides buoyancy based on the amount of gas within it and an attachment point for the articulating arm (1c). The cube can move up or down the articulating arm (via mechanical or electrical adjustment) adjusting its distance from the transmission. In one embodiment, each edge of the cube has an extension wing (1d) at approximately 135 degrees that is connected to the wing next to it (1e). This forms a dynamic shape is known to the inventors as a "Tesseract." This shape is uniquely suited to capture horizontal wave motion no matter its angle to the prevailing wave force and convert that motion into movement of an articulating arm.

The buoyancy of the central cube can adjust based on conditions and will act to raise the collection unit to the vertical position. Additionally, at full buoyancy the whole unit can float, which allows for towing and lowering the unit into position for operation and facilitates easier access for maintenance.

As the tesseract collection unit moves with the waves and has no exposed moving parts it poses minimal risk to marine life (e.g., unlike spinning turbines). Fish can swim up to or onto the unit without harm.

The kinetic forces that drive this collection unit are the back and forth horizontal wave motions that move the collection unit as depicted in FIG. 2: Assume the articulating arm is in an almost horizontal position (approximately 160 degrees to the top of the transmission and to the right). This may be the case just after a wave has passed moving to the right. The sequence of motions that follow are;

1) the wave motion stops briefly and then reverses direction to the left. Due to the angle of the articulating arm, the wave's initial primary force pushes the collection unit in (down the articulating arm) towards the transmission (i.e. "in" on the z-axis).

2) At the same time, due to the shape of the tesseract, the wave starts to pivot the articulating arm towards vertical. As the angle of the articulating arm decreases from 160 towards 90 degrees to the top of the transmission, the primary wave force progressively decouples from the z-axis and simultaneously engages in some combination of the x and y axes depending on the orientation of the specific wave action.

3) Once the articulating arm passes 90 degrees and moves back towards horizontal in the opposite direction (i.e. to the left), the wave force now progressively decouples from the x, y axes and re-engages the z-axis moving the collection unit out (up the articulating arm) away from the transmission (i.e. "out" on the z-axis) until either the maximum limit of z-axis is reached or the wave motion stops. The process repeats in the opposite direction.

B. Cylindrical Paddle

FIG. 5 illustrates a collection unit described as a cylindrical tube/paddle. The cylindrical tube (2a) is placed in a flowing fluid, designed to capture the maximum force of that flowing fluid with an internal core (2b) that allows for buoyancy. This tube connects to the transmission via at least one or more articulating arms (2c and 2d), as shown in FIG. 4. The tube can move back, forth, in and out on the articulating arms. It can also adjust its average distance from the transmission (via mechanical or electrical adjustment), to increase efficiency and/or safety.

Figure 6A:
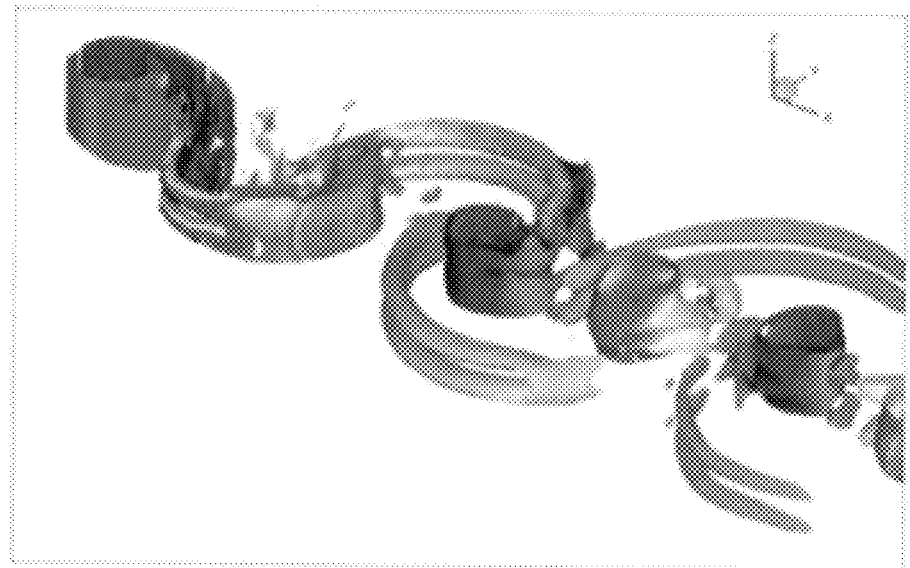
FIGS. 6A and 6B are illustrations of fluid flow diagrams illustrating turbulence created by a cylindrical object, according to an embodiment of the invention.
Figure 6B:
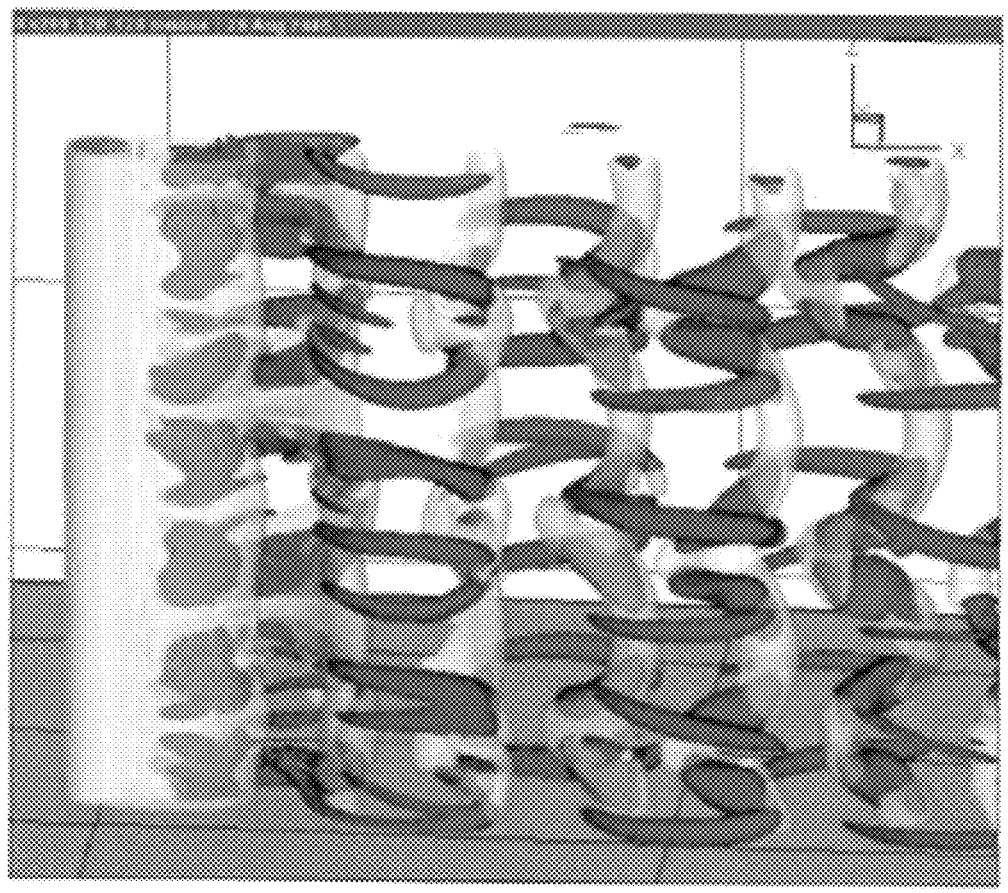

As the flow of fluid is primarily parallel to the articulating arm (2e) and orthogonal to this collection tube, the back, forth, in and out forces acting on this paddle to move the articulating arm occur as a result of the following principles of fluid dynamics, illustrated in the fluid flow diagrams of FIG. 6A and FIG. 6B. The study of fluid dynamics teaches that the fluid flow around stationary objects causes turbulence behind those objects. These forces are impacted by many factors and can change based on density of the fluid, viscosity, speed of flow, size of objects, depth, boundary layers, proximity to other objects, salinity, temperature, and other factors influencing the Reynolds number. However, it is this turbulence that provides the kinetic forces that drive the unit.

A more detailed look at this turbulence shows a relatively consistent back and forth flow that changes directions at angles oblique (sometimes at right angles or even in the opposite direction) to the primary direction of the fluid flow (FIG. 6A and FIG. 6B). This consistent back and forth flow has been well documented and often causes alternate vortexes to be formed in one direction and then in the opposite direction. These are often referred to as a Von Karman Vortex Street. The shape of these vortexes and the turbulent flow is impacted by the shape of the body causing them (i.e., a vertical column will tend to cause a series of vertical columns of vortexes and associated turbulence in vertical columns).

Figure 9:
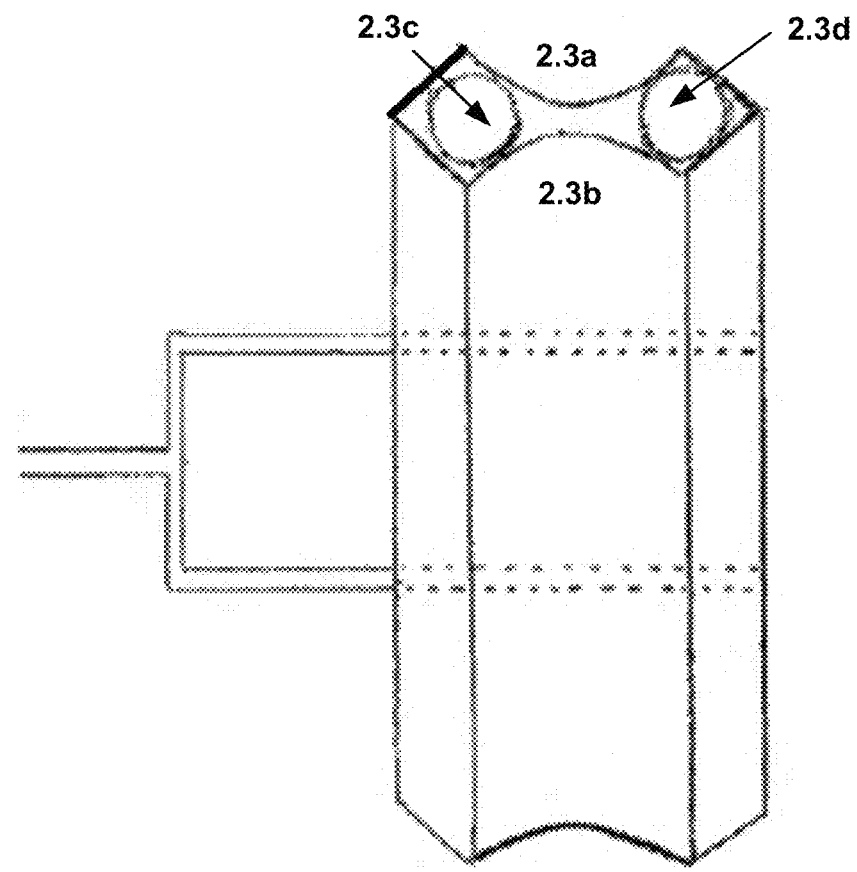
FIG. 9 illustrates a collection unit in the shape of back to back semi-circles, according to one embodiment of the invention.

To aid efficiency of energy harvesting the shape of the collection unit (in this case cylindrical) is influenced by the shape of the vortexes which as noted above is influenced by the shape of the first body impacting the flow. Another example of a shape of this collection unit may be two semi-circles placed back to back with a central core that allows for buoyancy, as shown in FIG. 9. As this turbulence is not always regular, horizontal or vertical fins may be added to the collection unit in an effort to capture additional directions of turbulent flow.

Existing energy harvesters have used these vortex phenomena to induce movement (known as vibration, galloping or fluttering). However, the motion of these prior units and their subsequent energy generation is from the object creating the vortexes. The current embodiment of this unit differs from the prior art as it is typically positioned behind an object creating the vortexes and is impacted by the changing direction of the fluid flow that is causing the vortexes.

This embodiment includes one stationary object impacting the flow of the fluid and a second unit that captures and converts the turbulence caused by that first object. That first object may be placed in the fluid as a part of this unit or may be an existing object in the fluid (e.g. pillar, post, leg of a bridge, or other stationary object). In the latter case the unit (transmission, generator and collection unit) would be positioned to capture and convert the existing turbulence.

C. Pendulum Bowl

FIGS. 7A and 7B are illustrations of a collection unit referred to by the inventor as a pendulum bowl. In one embodiment, the pendulum bowl is a weighted mass (3a) with an internal core (3B) that allows the articulating arm to attach and move closer or further away from the transmission. There is a space in the center of the bowl (3c) to allow clearance for the transmission. As this embodiment involves the unit being attached to the Prime Mover, it is the random back and forth (7B) or up and down (7A) movement of that Prime Mover that causes the relative motion between the weight (primarily influenced by gravity) and the unit (influenced by Prime Mover) that provides the kinetic forces that will be converted.

Some applications may include removing all or some of the enclosures and replacing this pendulum bowl with a weighted part of the Prime Mover in an effort to reduce overall weight and increase efficiency (one example might be to use the spare wheel or battery of a vehicle as the weighted mass).

D. Direct Attachment

FIG. 8 illustrates a direct attachment collection unit, where the articulating arm is attached between parts of a Prime Mover. For example, in one embodiment the unit is attached to the body of a vehicle (D1) and the articulating arm is attached directly to an axel (D2) similar to a shock absorber. The vibration from driving as well as the swinging of car axel will provide the kinetic force that is converted.

In an alternate embodiment, the articulating arm is connected between the transmission (e.g. connected to an engine, the prime mover) and a stationary object (the floor). As the engine runs it vibrates on the floor. This embodiment would dampen the vibration and convert the energy.

NOTE: The potential applications for this invention are not limited by size. They range from, very large ocean wave applications to very small (nano) applications in healthcare, robotics or many other fields.

VI. Transmission Unit

Figure 10A:
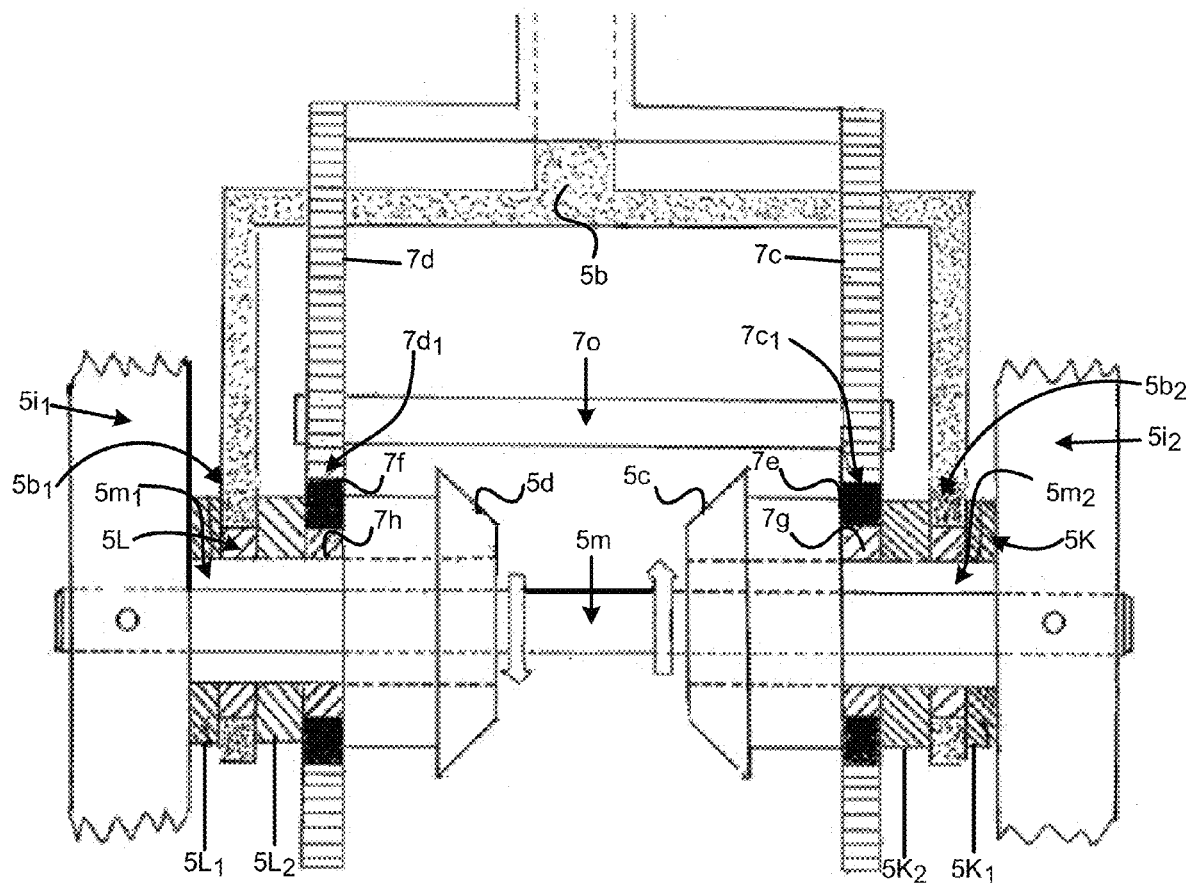
FIGS. 10A-10D illustrate one embodiment of a transmission unit which transfers multi-directional kinetic movement into directional movement for conversion into electricity, according to one embodiment of the invention.

The purpose of the transmission unit is to convert the random movement of an articulating arm (5a on FIG. 10A) into unidirectional rotation of an output shaft (5x on FIG. 10B), as illustrated in FIGS. 10A-10D. FIG. 10A is a drawing of the side view of the central input mechanism of the transmission element (E1) described in FIG. 10B.

FIG. 10A shows two U-shaped brackets attaching to the transmission unit at one end and together forming the articulating arm (5a) at the other. The top of the first U shaped bracket (7a) is a sleeve (connected at the very top (5a1) to the collection unit) that can slide over the top of the second U shaped bracket (7b). Together the top of (7a) and 7(b) make up the articulating arm (5a). Sleeve (7a) slides over (7b) and is connected to two gear racks (7c) and 7(d) that are guided by slide plate (7o). The gear racks (7c) and (7d) drive pinion gears (7e) and (7f) when the collection unit (and therefore sleeve (7a)) is moved up or down on this page (assume this is the z-axis). Pinion gears (7e) and (7f) each connect to one way bearings (7g) and (7h). These bearings are placed to face opposite directions, thereby allowing bearing (7g) to drive in the anticlockwise direction and freewheel in the clockwise direction (when viewed from the left side of the page) while bearing (7h) drives in the clockwise direction and can freewheel in the anticlockwise direction. Each of these bearings is seated on a sleeve (5m1) and (5m2) that can spin freely on shaft (5n) but is anchored individually to bevel gear (5c) and (5d).

The top of the second U shaped bracket (7b) ends inside the sleeve (7a) and together with slide plate (7o) act as a guide for gear racks (7c) and (7d). The bottom of this U shaped bracket (7b) forms a second part of the yolk that connects at each end (5b1) and (5b2) to one way bearings (5k) and (5L). These bearings are also placed to face opposite directions to each other (and the same as (7g) and (7h)), thereby allowing bearing (5k) to drive in the anticlockwise direction and freewheel in the clockwise direction (same as one way bearing (7g)) while bearing (5L) drives in the clockwise direction and can freewheel in the anticlockwise direction (same as one way bearing (7h)). Each of these bearings is also seated on a sleeve (5m1) and (5m2) that can spin freely on shaft (5n). This shaft (5n) is connected solidly to the walls of the housing (5i1) and (5i2). The two ends of the yoke (5b1 & 5b2) as well as the one way bearings (5k and 5L) are separated from the housing walls (5i1 & 5i2) by two thrust washers (5k1) and (5L1) They are also separated from pinion gear (7e) and (7f), the contact point of the racks (7d1) and (7c1) and bearings (7g) and (7h) by thrust washer (5k2) and (5L2). The sleeves (5m1) and (5m2) are solidly attached to bevel gears (5c) and (5d) such that when articulating arm (5a) moves back and forth orthogonal to shaft (5n) one way bearing (5k) will only drive when turned anticlockwise and will then rotate sleeve (5m1) and bevel gear (5c) anticlockwise. When articulating arm (5a) moves in the other direction and one way bearing (5k) is turned clockwise it will freewheel over sleeve (5m1). Similarly when one way bearing (5L) is turned clockwise it will then rotate sleeve (5m2) and bevel gear (5d) clockwise otherwise will rotate freely over sleeve (5m2). Additionally and similarly, when the articulating arm moves up the page it will turn and drive one way bearing (7h) in the clockwise direction while bearing (7g) freewheels and when the arm moves down the page it will turn and drive one way bearing (7g) anticlockwise while one way bearing (7h) freewheels.

Note: In the event of simultaneous motion of the articulating arm, let's assume, in and left or out and left (or any combination of the 3 axes) the effect of drive on the sleeves is the same due to coordination of location and direction of the each of the one way bearings. The fastest of the movements will drive the output shaft ($5x$, as depicted in FIG. 5B).

Figure 10B:
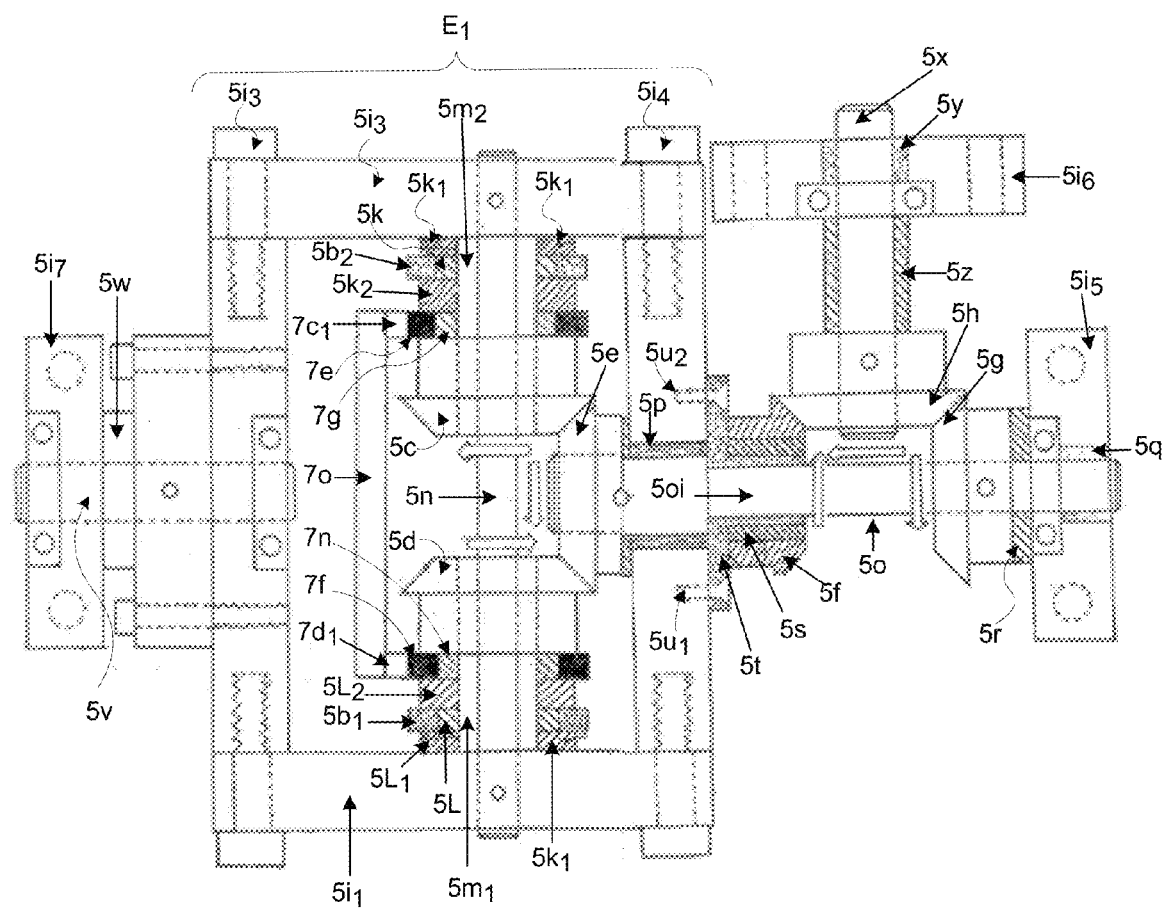
Figure 10C:
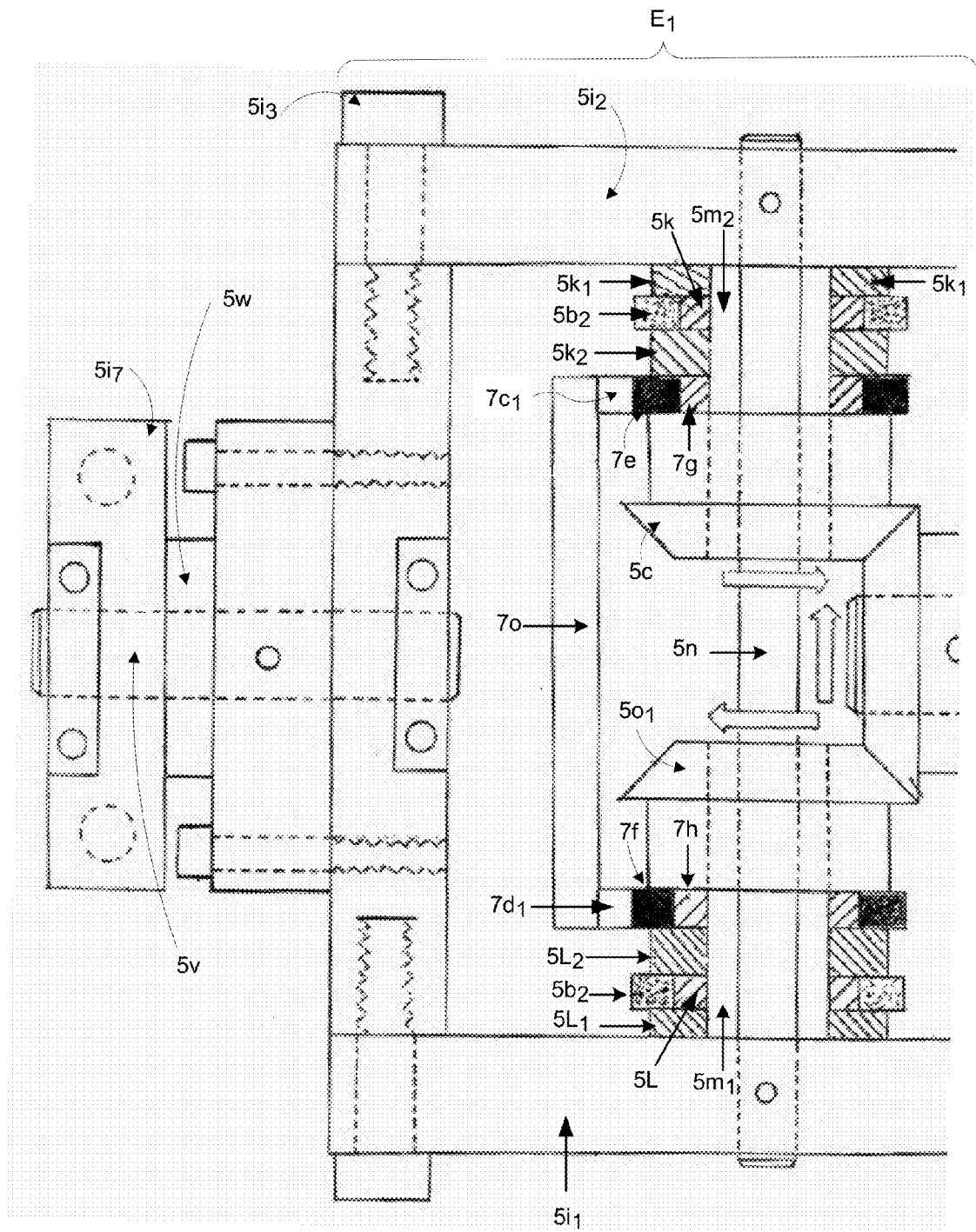
Figure 10D:
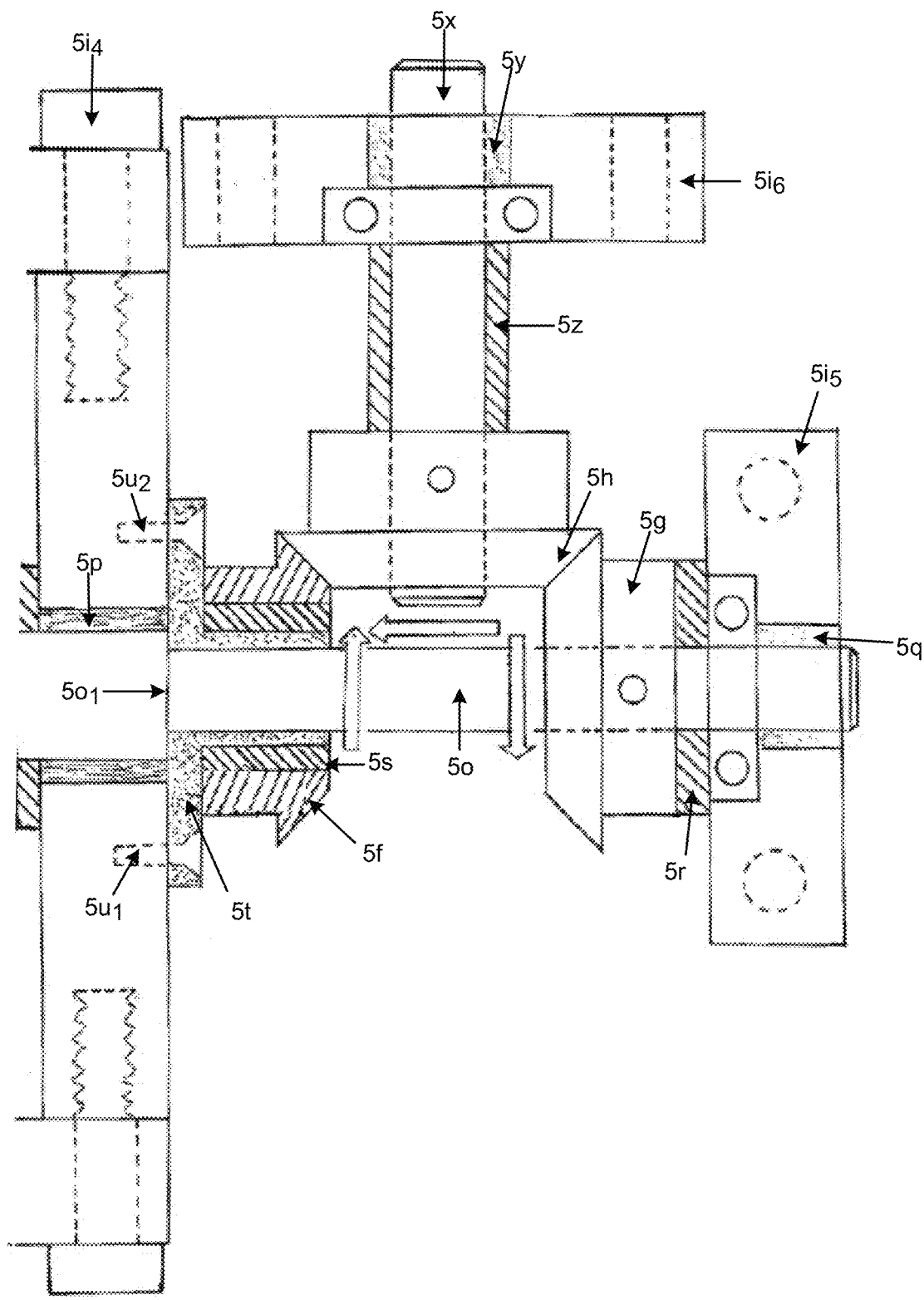

FIG. 10B depicts the transmission without the full articulating arms and yokes ($5a$, $5b$, $7a$, $7b$—FIG. 5A). Only the ends of the yokes ($5b1$) and ($5b2$) and the contact points of racks ($7c1$) and ($7d1$) are depicted.

The transmission consists of a system of six bevel gears. These are all placed into a configuration of housing walls. Housing walls ($5i1$, $5i2$, $5i3$, $5i4$) are all movable around a split shaft ($5v$) and ($5o$). Housing walls ($5i5$, $5i6$, $5i7$) are stationary and anchored to a solid base. This together creates part of an element (E1) that has the function of a gimbal. Bevel gears ($5c$ and $5d$) are connected orthogonally on either side of bevel gear ($5e$). Because the three gears are interconnected in this way, if bevel gear ($5c$) turns anticlockwise, bevel gear ($5e$) will turn clockwise, if viewed from the left side of the page, and bevel gear ($5d$) will also turn clockwise.

Bevel gear ($5c$) is driven anticlockwise by the articulating arm ($5a$—not shown in FIG. 10B) moving right to left across the page (assume this movement is on the x-axis) by engaging only one way bearing ($5k$) while one way bearing ($5L$) freewheels, it (bevel gear ($5c$)) will drive bevel gear ($5e$) clockwise which in turn will turn bevel gear ($5d$) clockwise which is consistent with one way bearing ($5L$)'s freewheel direction relative to the sleeve ($5m1$).

Bevel gear ($5c$) is also driven anticlockwise by the articulating arm ($5a$—not shown in FIG. B) moving into the page (assume this movement is on the z axis) by rotating pinion gear ($7e$) anticlockwise and engaging only one way bearing ($7g$) while one way bearings ($7h$), ($5k$) and ($5L$) freewheel. This will drive bevel gear ($5c$) anticlockwise which in turn will also drive bevel gear ($5e$) clockwise.

Similarly, bevel gear ($5d$) is driven clockwise by the articulating arm ($5a$—not shown in FIG. 10B) moving left to right across the page (assume this movement is also on the x-axis) engaging only one way bearing ($5L$) while bearing ($5k$) freewheels, it (bevel gear ($5(d)$)) will drive bevel gear ($5e$) in the same clockwise direction (as before) which in turn will turn bevel gear ($5c$) anticlockwise which is consistent with one way bearing ($5k$)'s freewheel direction relative to the sleeve ($5m2$).

Bevel gear ($5d$) is also driven clockwise by the articulating arm ($5a$—not shown in FIG. B) moving out of the page (assume this movement is on the z axis) by rotating pinion gear ($7f$) clockwise and engaging only one way bearing ($7h$) while one way bearings ($7g$), ($5k$) and ($5L$) freewheel. This will drive bevel gear ($5d$) clockwise which in turn will also drive bevel gear ($5e$) clockwise.

Bevel gear ($5e$) is solidly attached to output shaft ($5o$) which in this embodiment is shown to reduce in diameter at ($501$) to illustrate flexibility with different size options. Bevel gear ($5h$) also has flexibility in size.

Therefore the effect of moving the articulating arm left to right or right to left across the page on the x-axis or into or out of the page on the z-axis with this configuration will always drive bevel gear ($5e$) and output shaft ($5o$) in the clockwise direction.

It should be noted that shaft ($5o$) always drives in the clockwise direction and is free to continue to rotate in the clockwise direction if driven.

The second part of the gimbal movement is the motion of the articulating arm from top to bottom and bottom to top over the page (assume this is on the y-axis). This is achieved by pivoting movable housing walls ($5i1$, $5i2$, $5i3$ & $5i4$) on two shafts, output shaft ($5o$) rotating in bearing ($5q$) located in stationary housing wall ($5i5$) and shaft ($5v$) rotating in bearing ($5w$) located in stationary housing wall ($5i7$).

Notice that shaft ($5o$) passes through movable housing wall ($5i4$) and is supported by bearing ($5p$).

Bevel gear ($5g$) attaches solidly to shaft ($5o$). Therefore bevel gear ($5g$) is always driven in a clockwise direction (another preferred design option is to add a one way bearing between bevel gear ($5g$) and shaft ($5o$)). Bevel gear ($5g$) is separated from housing wall ($5i5$) by a thrust washer ($5r$).

Bevel gear ($5f$) is solidly attached to a one way bearing ($5s$) which is seated on a sleeve ($5t$) that is "T" shaped and attaches to the movable housing wall ($5i4$) via screws ($5u1$ and $5u2$). This sleeve ($5t$) can spin freely over output shaft ($5o$). This arrangement allows bevel gear ($5f$) to be turned anticlockwise which is consistent with one way bearing ($5s$)'s freewheel direction relative to sleeve ($5t$) when driven by the clockwise drive of bevel gear ($5g$). Alternately, one way bearing ($5s$) will engage on sleeve ($5t$) to drive it and bevel gear ($5f$) anticlockwise if movable housing wall ($5i4$) is rotated anticlockwise. All of which drive bevel gear ($5h$) anticlockwise.

Bevel gears ($5f$) and ($5g$) connect orthogonally on either side of bevel gear ($5h$). Because the three gears are interconnected in this way and as bevel gear ($5g$) always turns clockwise, bevel gear ($5f$) will always turn anticlockwise and bevel gear ($5h$) which is solidly attached to output shaft ($5x$) will also always turn anticlockwise. Output shaft ($5x$) is supported by bearing ($5y$) located inside stationary housing wall ($5i6$). Bevel gear ($5h$) is separated from stationary housing wall ($5i6$) by thrust bushing ($5z$).

The clockwise drive of bevel gear ($5g$) and therefore the anticlockwise rotation of Bevel gear ($5h$) and output shaft ($5x$) is caused by five of the six motions of the articulating arm ($5a$—not shown in FIG. 5B) on its axes—

1) Left to right on the x-axis as detailed above
2) Right to left on the x-axis as detailed above or
3) Out to in on the z-axis as detailed above or
4) In to out on the z-axis as detailed above or
5) Top to bottom on the y-axis.

The top to bottom motion of the articulating arm rotates movable housing walls ($5i1$, $5i2$, $5i3$ & $5i4$) clockwise. Bevel gears ($5c$) and ($5d$), and therefore bevel gear ($5e$), do not rotate relative to each other due to this motion. However, this set of bevel gears being rotated by the housing walls in this clockwise direction causes shaft ($5o$) to rotate clockwise relative to bevel gear bevel gear ($5g$) also driving it clockwise.

The sixth motion of the articulating arm (bottom to top on the y-axis) does not drive bevel gear ($5g$) clockwise, rather it drives bevel gear ($5f$) anticlockwise causing bevel gear ($5g$) to be driven clockwise—having the same effect of continuing to drive the output shaft ($5x$) anticlockwise. This motion (bottom to top on the y-axis) rotates movable housing walls ($5i1$, $5i2$, $5i3$ & $5i4$) anticlockwise. This rotates sleeve ($5t$) anticlockwise engaging one way bearing ($5s$) and driving bevel gear ($5f$) anticlockwise. This anticlockwise sleeve rotation of ($5t$) causes bevel gears ($5h$) and output shaft ($5x$) to continue to rotate in the same anticlockwise direction. Bevel gear ($5g$) and shaft ($5o$) will be driven in the clockwise direction which is consistent with the description above.

The resulting transmission can convert inconsistent, erratic or random movement of the articulating arm in any direction: left to right or right to left on the x-axis; as well as, top to bottom or bottom to top on the y-axis; as well as in to out or out to in on the z-axis; or any combination of these angles of movement into unidirectional rotation of a drive shaft.

There are many potential uses for this device such as to spin a generator/alternator, flywheel, attach directly to a pump, or potentially many other uses.

Previous devices describe that various forms of random kinetic motion can be converted into electricity, and some also teach that it can be converted into unidirectional rotation of a drive shaft. However, the efficiency and versatility of the prior transmissions used to perform that function is improved upon by the current embodiments.

Figure 11A:
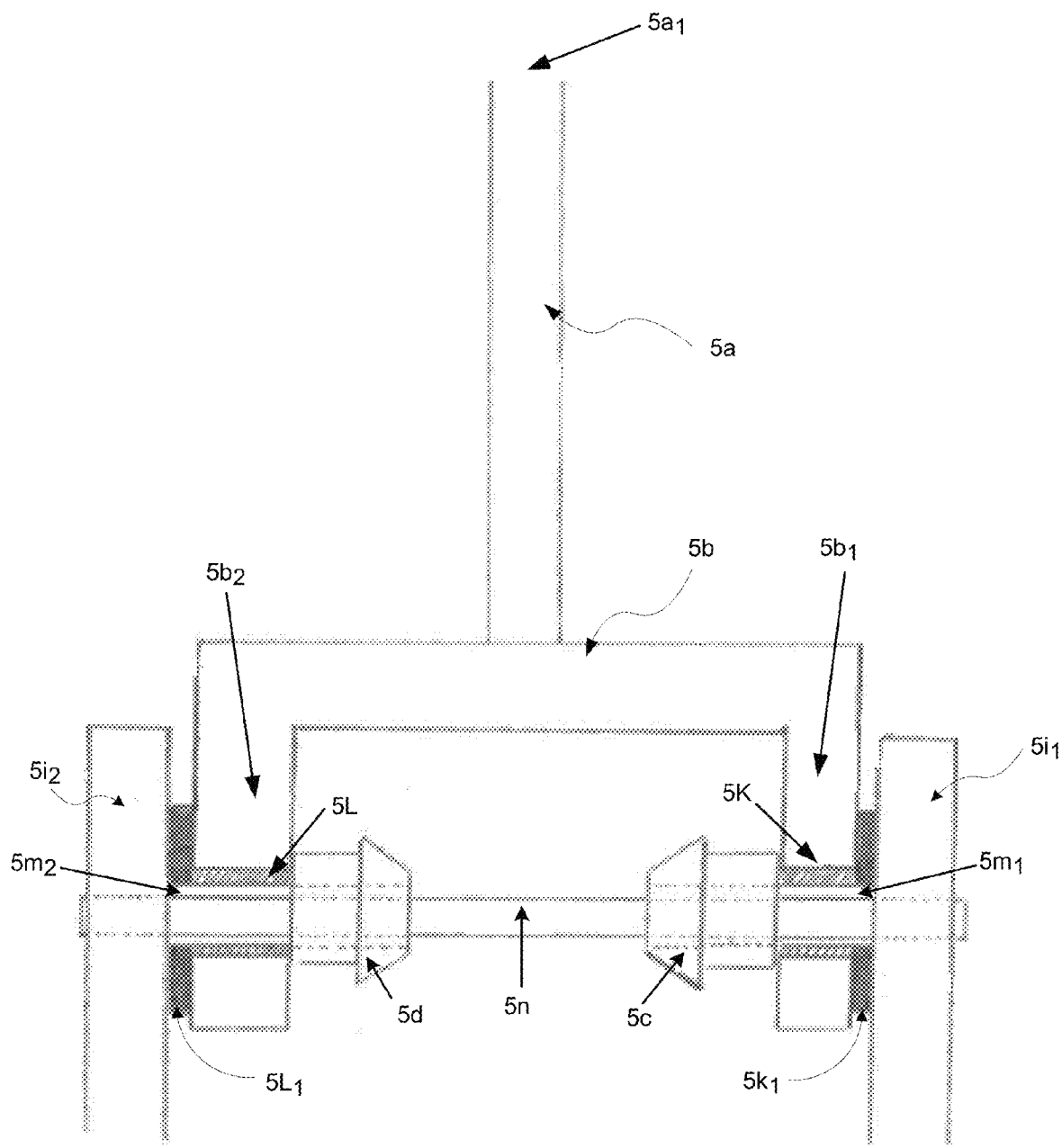
FIGS. 11A and 11B illustrate an alternative embodiment of the transmission, according to one embodiment of the invention.
Figure 11B:
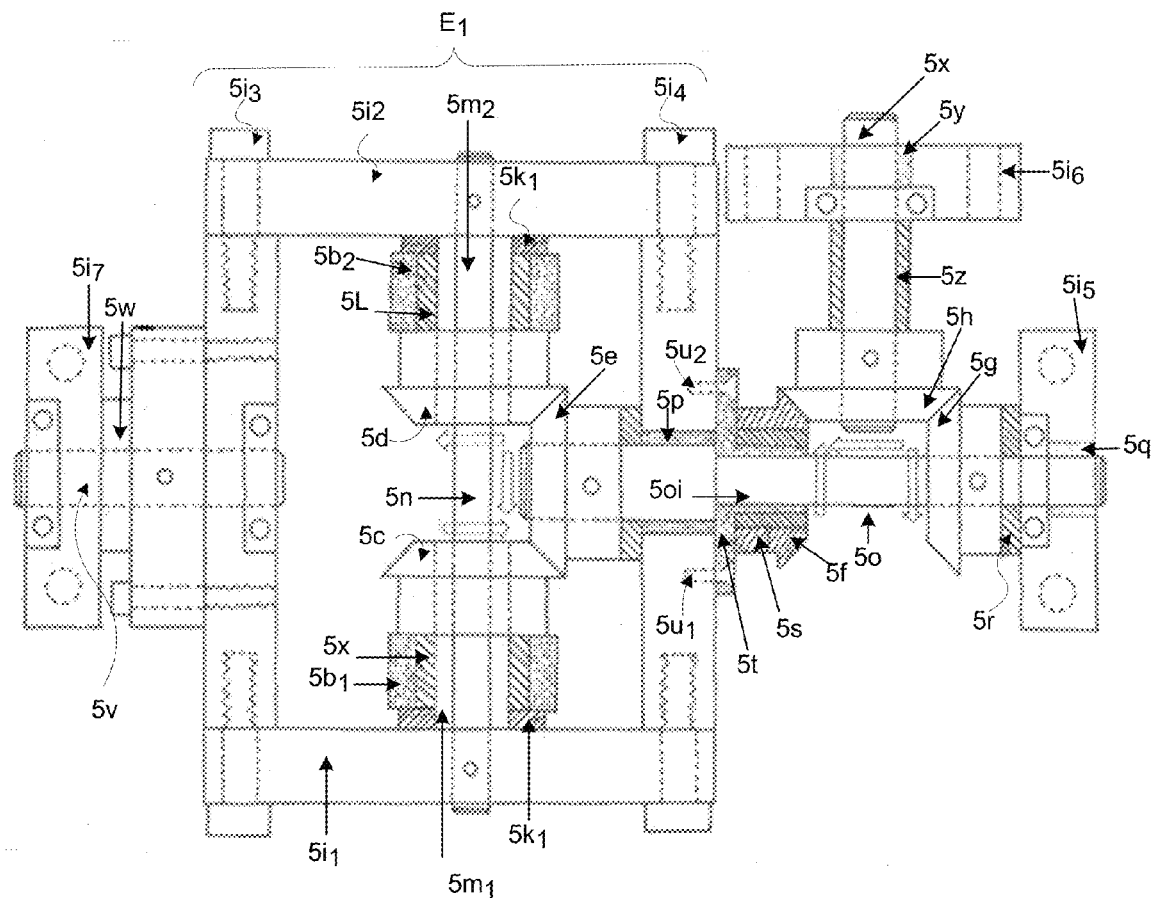

These improvements can be measured based on the following assumptions for proper and efficient functioning of a transmission:

1. This transmission works on three axes (X, Y and Z)
2. All else equal, the fewer gears used in a transmission the lower the internal friction and the simpler the design, build and maintenance of the unit leading to a lower cost of production and maintenance as well as a more efficient transmission.
3. The ability to scale the transmission without major design changes results in a more versatile transmission with lower overall production and maintenance costs.
4. If the same external force (A) is applied in each direction to the input (drive) shaft, the same torque (B) should be expected at the output shaft. (e.g. A force of "A" Newtons in the "Y" axis produces "B" rotations of the output shaft at "C" speed—If that same force was to act in the "X" axis it would be expected to produce the same result). This will result in an even distribution of power transfer and smooth operation of the transmission [84] An alternative embodiment of the transmission unit which provides for movement in two axes is illustrated in FIG. 11A and FIG. 11B. FIG. 11A is a drawing of the central input mechanism of the transmission element (E1) described in FIG. 11B below. This includes an articulating arm (5a) which connects to one of the collection units at (5a1) on the one end and to the center of a U shaped bracket (yoke) (5b) on the other end. This yoke then connects at each end (5b1) and (5b2) to one way bearings (5k) and (5L). These bearings are placed to face opposite directions, thereby allowing bearing (5k) to drive in the clockwise direction and freewheel in the anticlockwise direction while bearing (5L) drives in the anticlockwise direction and can freewheel in the clockwise direction. Each of these bearings is seated on a sleeve (5m1) and (5m2) that can spin freely on shaft (5n). This shaft (5n) is connected solidly to the walls of the housing (5i1) and (5i2). The ends of the two ends of the yoke (5b1 & 5b2) as well as the one way bearings (5k and 5L) are separated from the housing walls (5i1 & 5i2) by two thrust washers (5k1) and (5L1). The sleeves (5m1) and (5m2) are solidly attached to bevel gears (5c) and (5d) such that when articulating arm (5a) moves back and forth orthogonal to shaft (5n) one way bearing (5k) will only drive when turned clockwise and will then rotate sleeve (5m1) and bevel gear (5c) clockwise. When articulating arm (5a) moves in the other direction and one way bearing (5k) is turned anticlockwise it will freewheel over sleeve (5m1). Similarly when one way bearing (5L) is turned anticlockwise it will then rotate sleeve (5m2) and bevel gear (5d) anticlockwise, and otherwise will rotate freely over sleeve (5m2).

FIG. 11B depicts the transmission without the full articulating arm (5a—FIG. 11A) and the yoke (5b—FIG. 11 a). Only the ends of the yoke (5b1) and (5b2) are depicted.

The transmission consists of a system of six bevel gears. These are all placed into a configuration of housing walls. Housing walls (5i1, 5i2, 5i3, 5i4) are all movable around a split shaft (5v) and (5o). Housing walls (5i5, 5i6, 5i7) are stationary and anchored to a solid base all creating part of an element (E1) that has the function of a gimbal. Bevel gears (5c and 5d) are connected orthogonally on either side of bevel gear (5e). Because the three gears are interconnected in this way, if bevel gear (5c) turns clockwise, bevel gear (5e) will turn clockwise and, if viewed from the left side of the page, bevel gear (5d) will turn anticlockwise.

Bevel gear (5c) is driven clockwise by the articulating arm (5a—not shown in FIG. 11B) moving left to right across the page (assume this left to right movement is on the x-axis) by engaging only one way bearing (5k) while bearing (5L) freewheels, it (bevel gear (5c)) will drive bevel gear (5e) clockwise which in turn will turn bevel gear (5d) anticlockwise which is consistent with one way bearing (5L)'s freewheel direction relative to the sleeve (5m2).

Similarly, bevel gear (5d) is driven anticlockwise by the articulating arm (5a—not shown in FIG. 11B) moving right to left across the page (assume this right to left movement is on the x-axis) engaging only one way bearing (5L) while bearing (5k) freewheels, it (bevel gear (5(d)) will drive bevel gear (5e) in the same clockwise direction (as before) which in turn will turn bevel gear (5c) clockwise which is consistent with one way bearing (5k)'s freewheel direction relative to the sleeve (5m1).

Bevel gear (5e) is solidly attached to output shaft (5o) which in this embodiment is shown to reduce in diameter at (5o1) to illustrate the different size gears of (5f and 5g) from (5c, 5d & 5e). Therefore the effect of moving the articulating arm left to right or right to left across the page on the x-axis with this configuration will always drive output shaft (5o) in the clockwise direction.

It should be noted that shaft (5o) always drives in the clockwise direction and is free to continue to rotate in the clockwise direction if driven.

The second part of the gimbal movement is the motion of the articulating arm from top to bottom and bottom to top over the page (assume this is on the y-axis). This is achieved by pivoting movable housing walls (5i1, 5i2, 5i3 & 5i4) on two shafts, output shaft (5o) rotating in bearing (5q) located in stationary housing wall (5i5) and shaft (5v) rotating in bearing (5w) located in stationary housing wall (5i7).

Notice that shaft (5o) passes through movable housing wall (5i4) and is supported by bearing (5p).

Bevel gear (5g) attaches solidly to shaft (5o). Therefore bevel gear (5g) is always driven in a clockwise direction. Bevel gear (5g) is separated from housing wall (5i5) by a thrust washer (5r).

Bevel gear (5f) is solidly attached to a one way bearing (5s) which is seated on a sleeve (5t) that is "T" shaped and attaches to the movable housing wall (5i4) via screws (5u1 and 5u2). This sleeve (5t) can spin freely over output shaft (5o). This arrangement allows bevel gear (5f) to be turned anticlockwise which is consistent with one way bearing (5s)'s freewheel direction relative to sleeve (5t) when driven by the clockwise drive of bevel gear (5g). Alternatively, one way bearing (5s) will engage on sleeve (5t) to drive it and bevel gear (5f) anticlockwise if movable housing wall (5i4) is rotated anticlockwise.

Bevel gears (5*f*) and (5*g*) connect orthogonally on either side of bevel gear (5*h*). Because the three gears are interconnected in this way and as bevel gear (5*g*) always turns clockwise, bevel gear (5*f*) will always turn anticlockwise and bevel gear (5*h*) which is solidly attached to output shaft (5*x*) will always turn anticlockwise. Output shaft (5*x*) is supported by bearing (5*y*) located inside stationary housing wall (5*i*6). Bevel gear (5*h*) is separated from stationary housing wall (5*i*6) by trust bushing (5*z*).

The clockwise drive of bevel gear (5*g*) and therefore the anticlockwise rotation of Bevel gear (5*h*) and output shaft (5*x*) is caused by three of the four motions of the articulating arm (5*a*—not shown in FIG. 11B) on its axes—

1) Left to right on the x-axis as detailed above,
2) Right to left on the x-axis as detailed above, or
3) Top to bottom on the y-axis.

The top to bottom motion of the articulating arm rotates movable housing walls (5*i*1, 5*i*2, 5*i*3 & 5*i*4) clockwise. Bevel gears (5*c*) and (5*d*) and therefore bevel gear (5*e*) do not rotate relative to each other due to this motion. However this set of bevel gears being rotated by the housing walls in this clockwise direction does cause shaft (5*o*) to rotate clockwise relative to bevel gear bevel gear (5*g*) driving it clockwise as well The fourth motion of the articulating arm (bottom to top on the y-axis) does not drive bevel gear (5*g*) clockwise rather it drives bevel gear (5*f*) anticlockwise causing bevel gear (5*g*) to be driven clockwise—having the same effect of continuing to drive the output shaft (5*x*) anticlockwise. This motion (bottom to top on the y-axis) rotates movable housing walls (5*i*1, 5*i*2, 5*i*3 & 5*i*4) anticlockwise. This rotates sleeve (5*t*) anticlockwise engaging one way bearing (5*s*) and driving bevel gear (5*f*) anticlockwise. This causes bevel gears (5*h*) and output shaft (5*x*) to continue to rotate in the same anticlockwise direction. Bevel gear (5*g*) and shaft (5*o*) will be driven in the clockwise direction which is consistent with the description above.

The resulting transmission can convert inconsistent, erratic or random movement of the articulating arm in any direction, left to right or right to left on the x-axis, as well as, top to bottom or bottom to top on the y-axis, or any combination of these angles of movement into unidirectional rotation of a drive shaft.

There are many potential uses for this device such as to spin a generator/alternator, flywheel, attach directly to a pump, or potentially many other uses.

Previous devices describe that various forms of random kinetic motion can be converted into electricity, and some also teach that it can be converted into unidirectional rotation of a drive shaft. However, the efficiency and versatility of the prior transmissions used to perform that function is improved upon by the current embodiments.

These improvements can be measured based on the following assumptions for proper and efficient functioning of a transmission:

1. All else equal, the fewer gears used in a transmission the lower the internal friction and the simpler the design, build and maintenance of the unit will be. This leads to lower cost of production and maintenance as well as a more efficient transmission.
2. The ability to scale the transmission without major design changes will lead to a more versatile transmission and lower overall production and maintenance costs.
3. If the same external force (A) is applied in each direction to the input (drive) shaft, the same torque (B) should be expected at the output shaft. (e.g. A force of "A" Newtons in the "Y" axis produces "B" rotations of the output shaft at "C" speed—If that same force was to act in the "X" axis it would be expected to produce the same result). This will result in an even distribution of power transfer and smooth operation of the transmission.

VII. Energy Generation

In one embodiment, the device drives an electric generator, but the captured movement could be used for many other applications that would be evident to those skilled in the art. For example, the movement could be used to directly pump a fluid, pressurize a container or other similar functions.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

VIII. Pivoting Lever Arms

The aforementioned embodiments convert the linear movement of an articulating arm directly into rotation of a drive shaft. The number of drive shaft rotations (or portion thereof) is directly related to the angle of movement of the articulating arm as measured at the pivot point of rotation. Each movement is limited to a portion of one rotation for each movement of the articulating arm. For example, if the collection unit at the top of the articulating arm is pushed several meters in one direction (say, along the x-axis), it may achieve approximately 100 degrees of rotation as measured at the pivot point in the transmission. The attached drive shaft will also turn the same 100 degrees (or approximately 30% of one revolution).

To cause multiple rotations of a rotor in a generator, this partial rotation would need to be geared up (e.g. by utilizing a connected series of increasingly smaller diameter gears). Although this gearing is possible, it is sometimes not practical for large applications with large forces at work. The large amount of torque (rotational force) being placed on the drive shaft and associated bearings requires parts manufactured at great cost and weight to accommodate these forces. Therefore, simply scaling up the aforementioned transmissions to a large design is less practical.

Figure 12:
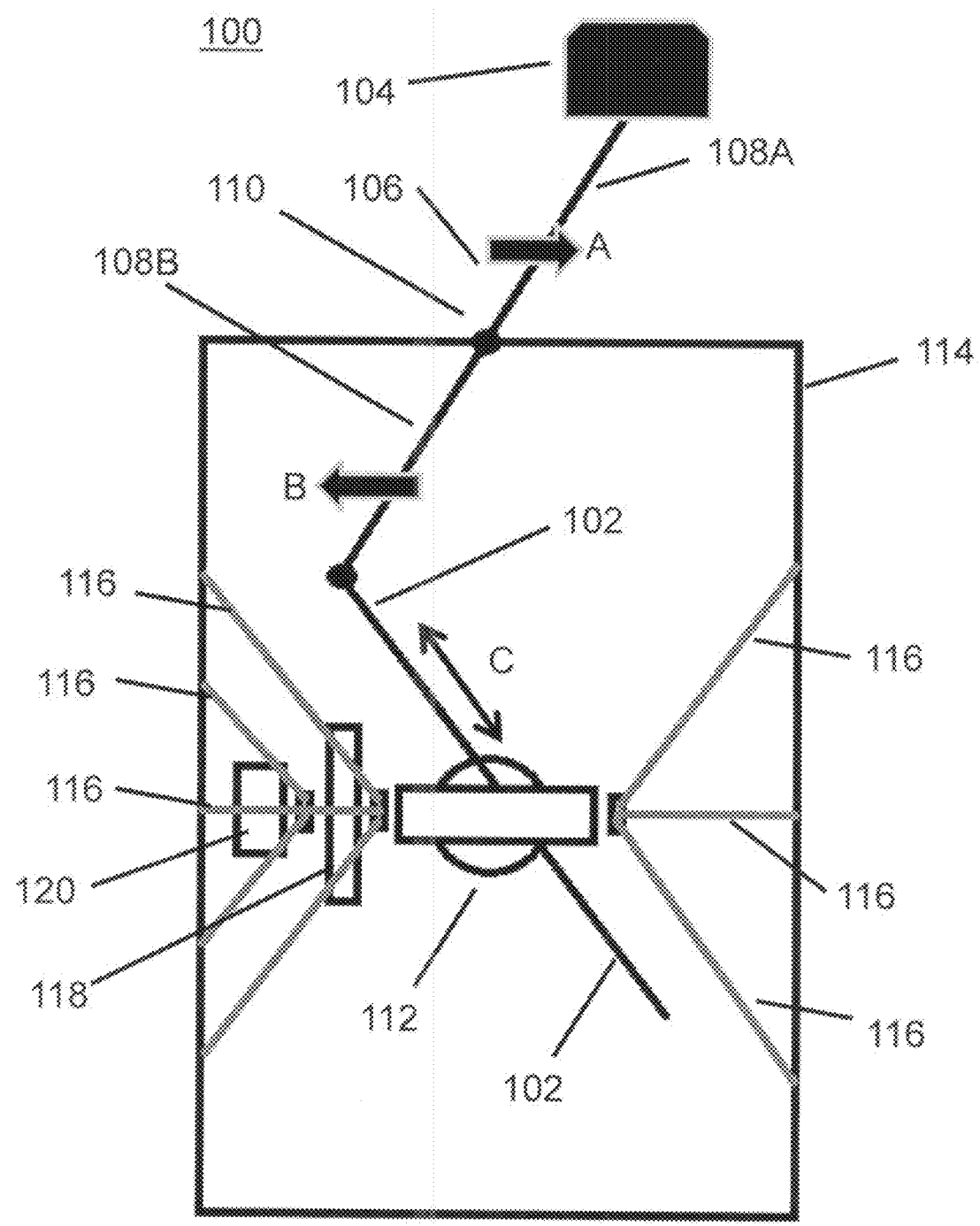
FIG. 12 illustrates one embodiment of a collection and transmission unit with a set of pivoting lever arms, according to one embodiment of the invention.

One potential solution for a large scale actuation and transmission system is illustrated in the embodiment of the collection and transmission unit 100 in FIG. 12, where the articulating arm 102 is separated from the collection unit (in this case a paddle 104) by a lever arm 106. Lever arm 106 connects at a first end to the paddle 104, pivots at a pivot point 110 and connects at a second end to articulating arm 102. Lever arm 106 is free to move along the X and Y axis as shown by arrow A. The portion of the lever arm 106 above the pivot point 110 which moves in the direction of arrow A is referred to as the outer lever arm 108A, while the portion of the lever arm 106 below pivot point 110 that connects to articulating arm 102 is referred to as the inner lever arm 108B. As the lever arm 106 moves along the X or Y axis in any direction, the inner lever arm 108B also moves along the X and Y axis but in the opposite direction as shown by arrow B. The outer lever arm 108A connected to the paddle 104 is typically longer in length than the inner lever arm 108B. The articulating arm 102 operates by moving in the direction of arrow C to interact directly with the transmission unit 112 which is free to rotate like a gimbal. The collection and transmission unit 100 illustrated here additionally includes a housing 114 along with structural supports 116 for the transmission unit 112 and connected flywheel 118, generator 120 and other gear components.

The primary design change in this embodiment is the moving of the pivot point of the original articulating arm (now the lever arm) above the transmission 112 to the housing 114. This creates the outer lever arm 108A and inner lever arm 108B (typically shorter than the outer lever arm) below the pivot point 110. This configuration allows for the conversion of the large movement of the outer lever arm 108A above the pivot point 110 into a mirror image of that motion on the inner lever arm 108B with the same energy but contained in a more condensed area below the pivot point 110 (more condensed than the movement of the lever arm 106 but less condensed than the previous embodiment which only allowed a percentage of one rotation of the drive shaft). The bottom of this short, inner lever arm 108B is attached to the top of the articulating arm 102 of the transmission 112. As the outer lever arm 108A moves in the x or y axis, it causes the in and out movement of the articulating arm 102 along the z-axis relative to the transmission 112. As the travel of this articulating arm 102 can be adjusted based on the length of the short, inner lever arm 108B below the pivot point 110 and the transmission articulating arm 102, the rotation of the drive shaft is no longer directly related to the angle of movement of the articulating arm; rather, it is related to the distance of movement of these two shorter arms. This therefore increases the number of rotations of the drive shaft for every movement of the articulating arm when compared to previous embodiments and thereby reduces the initial torque on the drive shaft and components without significantly reducing energy transferred to the transmission.

Figure 13:
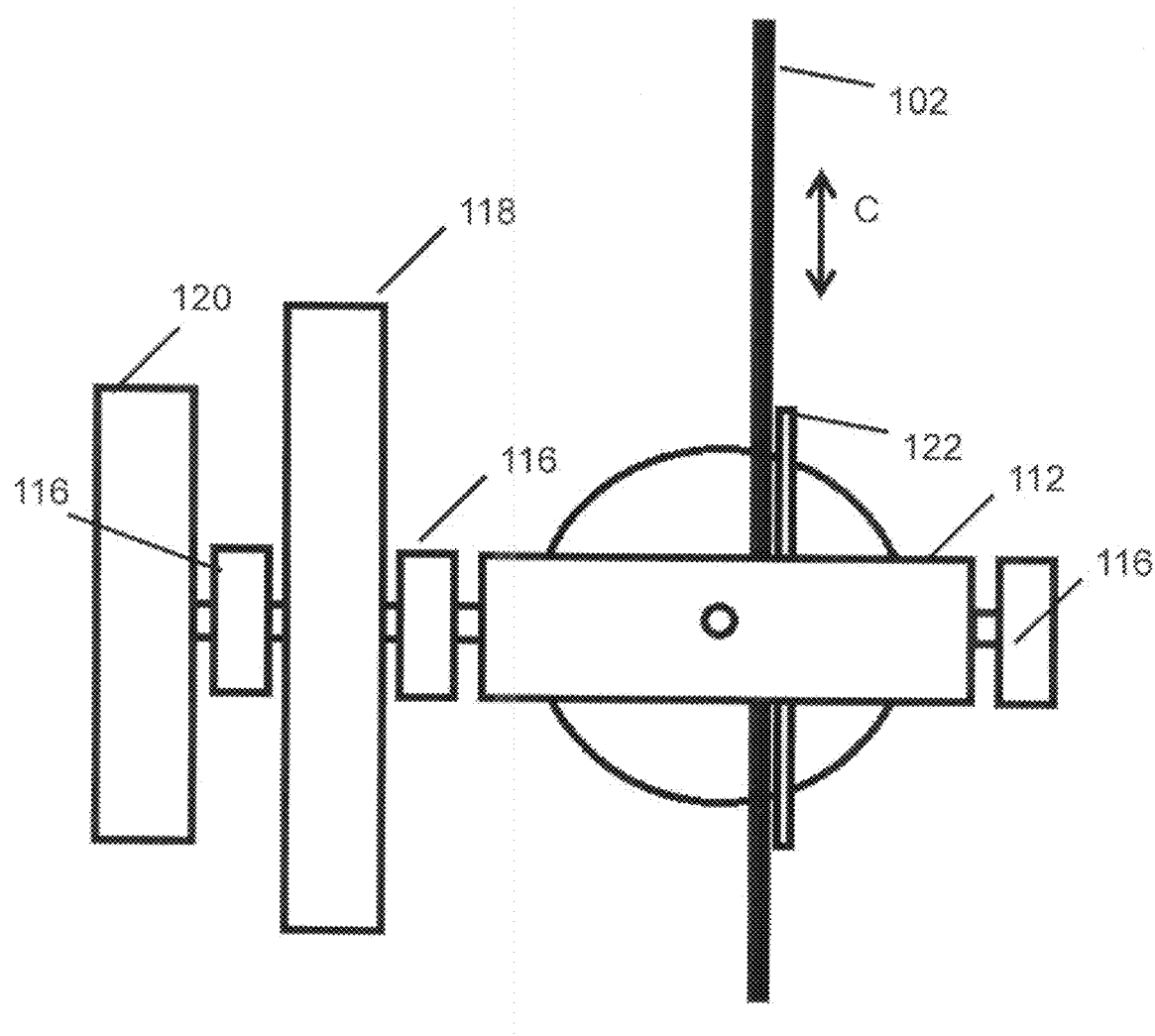
FIG. 13 illustrates one embodiment of a transmission system configured to operate with the set of pivoting lever arms, according to one embodiment of the invention.

FIG. 13 illustrates a larger view of this alternate embodiment of the transmission unit 112 configured to operate with the alternate pivoting lever arm configuration in FIG. 12. The central articulating arm 102 contacts the transmission unit 112, which then turns a series of gears to operate the flywheel 118 and ultimately the generator 120. A guide 122 is positioned alongside the articulating arm 102 to direct the articulating arm 102 into the transmission unit alongside the gears (see FIGS. 14 and 15, below for a more detailed illustration of the guide 122 and mechanism). This transmission unit 112 still transfers the z-axis motion of the articulating arm into unidirectional rotation, but it also allows freedom of movement in the x and y planes.

Figure 14:
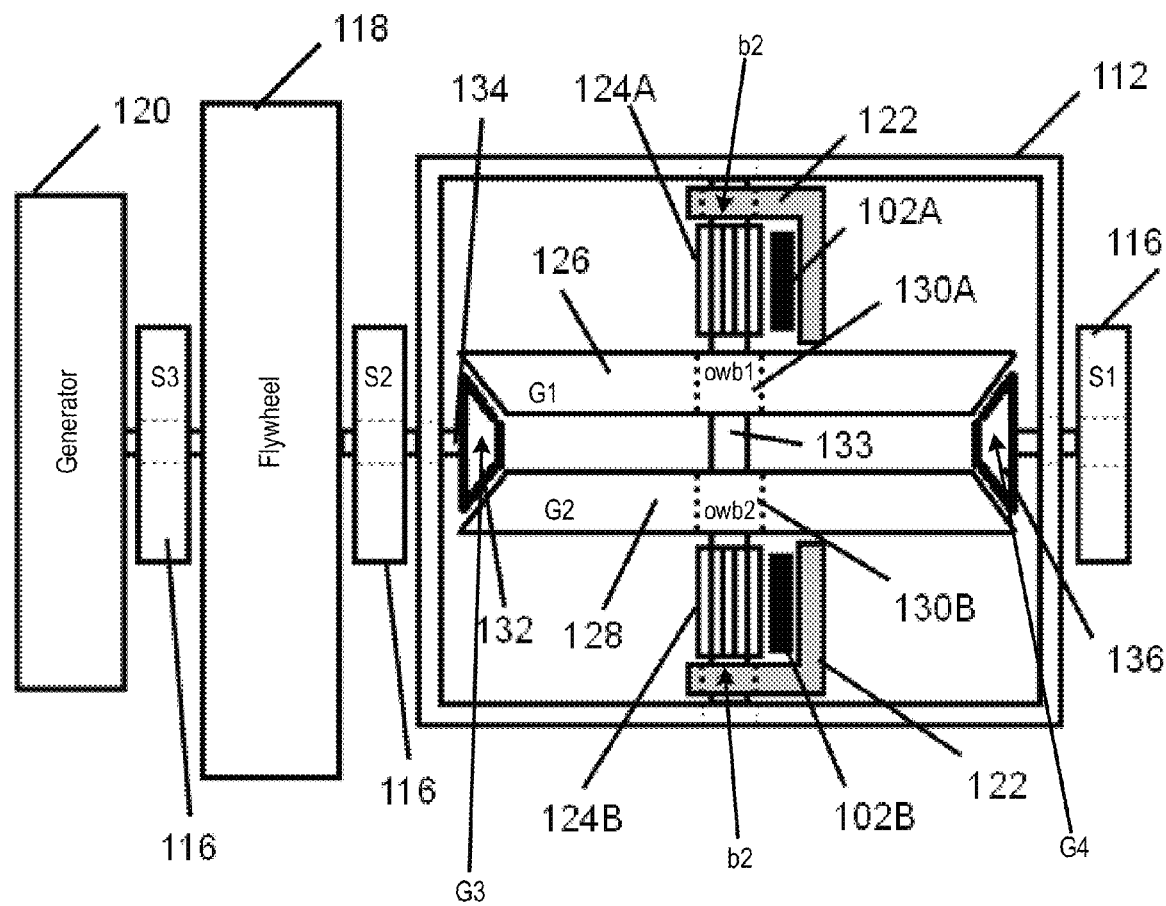
FIG. 14 illustrates a further embodiment of the transmission system configured to operate with the set of pivoting lever arms, according to one embodiment of the invention.

A more detailed illustration of the alternative transmission unit 112 is illustrated in FIG. 14, where in this example the articulating arm is divided into two parts, with a first articulating arm 102A and second articulating arm 102B operating to simultaneously interact with two pinion gears 124A and 124B. The guide 122 is positioned around each of the articulating arms 102A and 102B to mount the pinion gears and direct the articulating arms 102A and 102B against the pinion gears 124A and 124B to actuate the movement of the articulating arms 102A and 102B into rotational movement of the pinion gears 124A and 124B. The movement of the pinion gears 124A and 124B is then translated into movement of a first gear 126 and a second gear 128 through one way bearings 130A and 130B which are connected to the pinion gears via a primary shaft 133. It should be noted that one way bearings may be placed anywhere in the gear chain between pinion gear 124 and drive gear 132. The rotation of the first gear 126 and second gear 128 then operate on a third gear 132 (just as illustrated in the prior embodiments) which always rotates a drive shaft 134 in the same direction that then turns the flywheel 118 and ultimately the generator 120.

Also illustrated in FIG. 14, in one embodiment, an additional idler gear 136 may be added at an opposite end of the interaction between the first gear 126 and second gear 128 with the third gear 132. The idler gear 134 supports the transfer of force to the generator 120 and prevents the bending and flexing of the other gear and gear parts.

Figure 15:
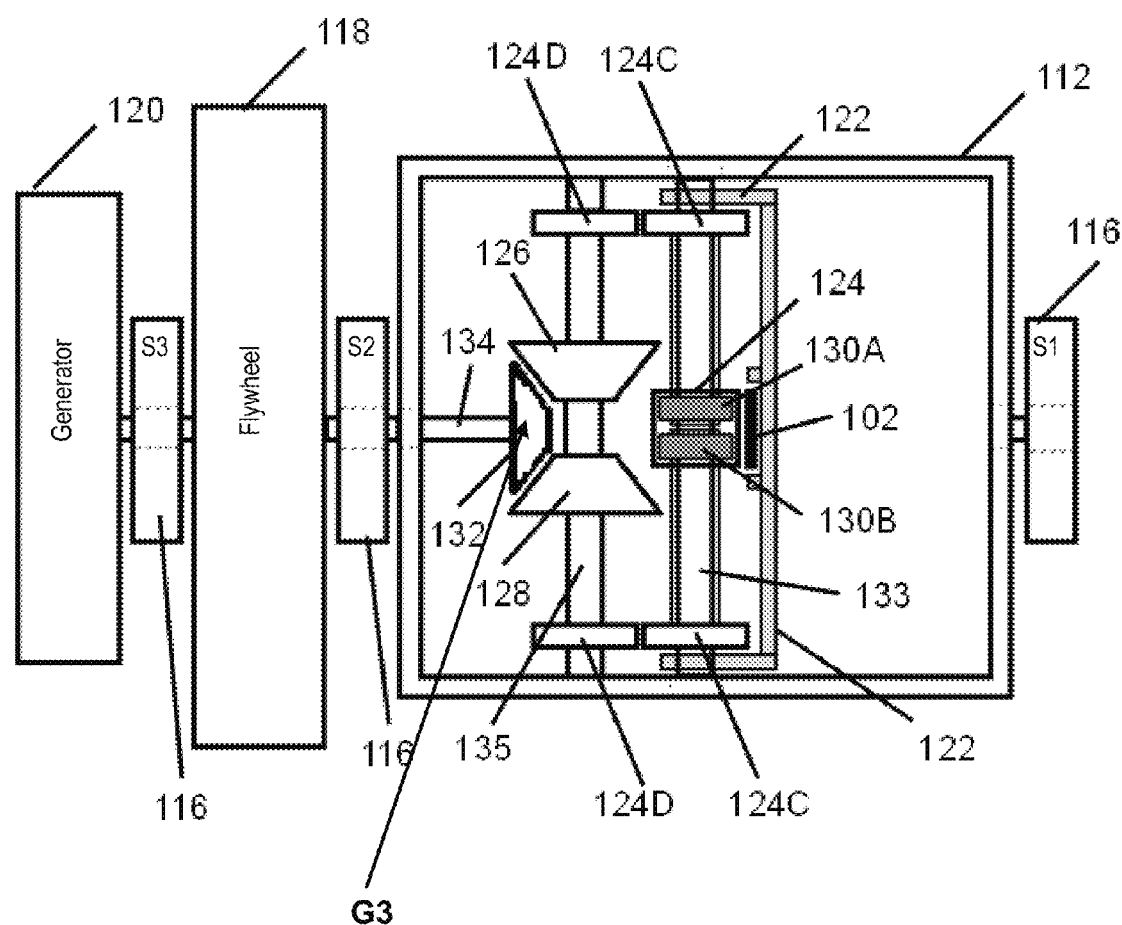
FIG. 15 illustrates yet another embodiment of the transmission system configured to operate with a pivoting lever arm, according to one embodiment of the invention.

An additional alternative embodiment of the transmission unit is further illustrated in FIG. 15, where a secondary shaft 135 is added adjacent to the primary shaft 133, where the primary shaft 133 still interfaces with the articulating arm 102 and a pinion gear 124 via one way bearings 130A and 130B, but where the resulting rotation of the primary shaft 133 is then translated to the secondary shaft 135 through connecting pinion gears 124C and 124D on adjacent sides of the transmission unit. The translated rotation of the secondary shaft 135 is then translated into rotation of the drive shaft 134 through the first gear 126 and the second gear 128 interfacing with the third gear 132. This alternative configuration allows for the reduction in the size of the gears. In a further embodiment, a single shaft and single articulating arm embodiment may be utilized where the single articulating arm as in FIG. 15 interfaces with a center portion of a single shaft between the first gear and second gear as in FIG. 14, allowing for a more compact design.

Figure 16:
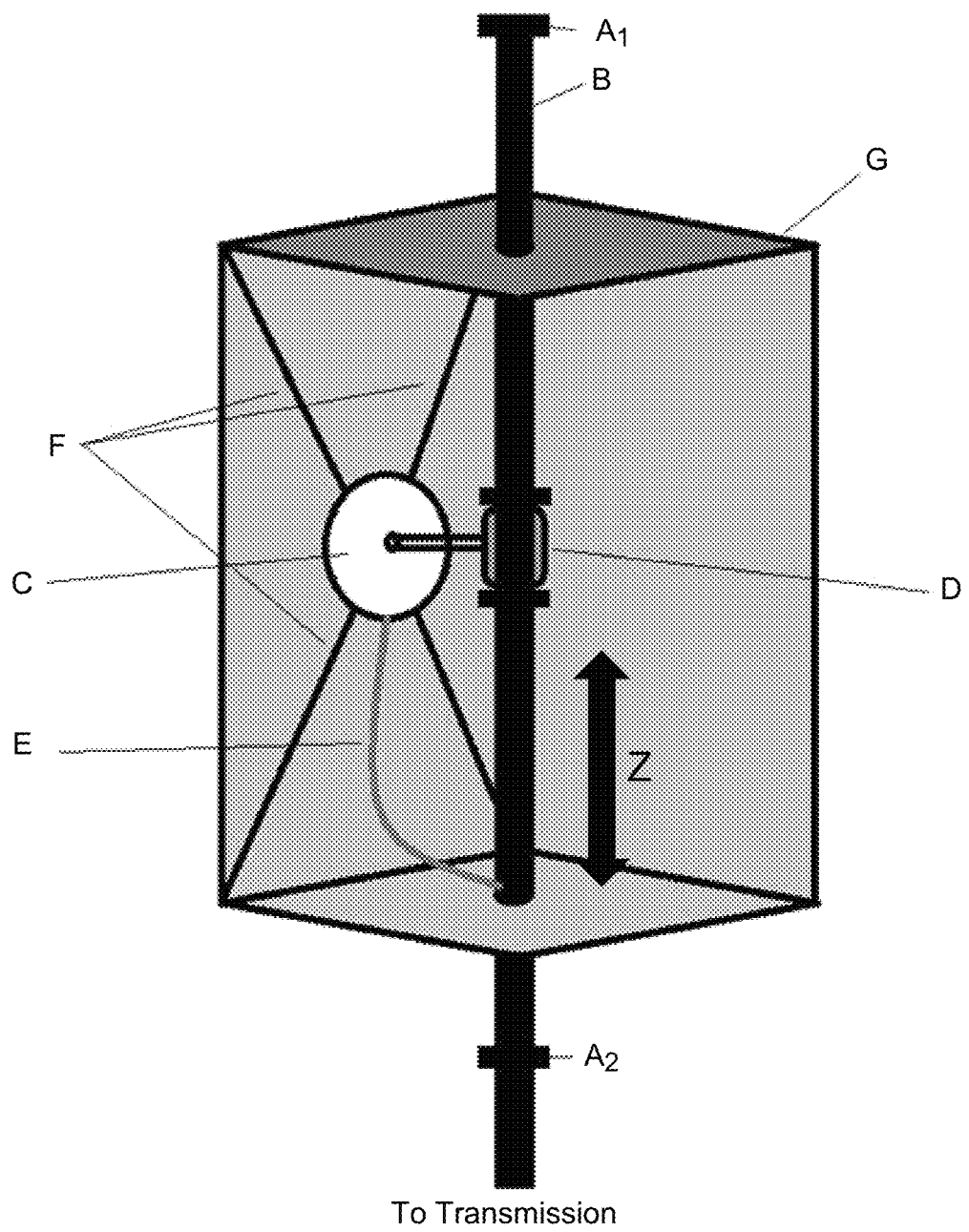
FIG. 16 illustrates one embodiment of a transmission and generator inside the unit configured to capture movement on a z-axis, according to one embodiment.

In a still further embodiment illustrated in FIG. 16, the unit may be configured to add motion in the Z-axis to the power generation ability of any of the designs. In this embodiment, the articulating arm B with a collection unit G moves with the prime mover (e.g. ocean waves). Collection unit G is able to slide up and down the articulating arm B in the direction of arrow Z between the stops A1 and A2, with or without springs or similar. This motion is in the Z-axis relative to the transmission which is located at the end of the articulating arm B. As collection unit G slides on articulating arm B (which may be threaded or toothed), the motion causes the rotation of worm gear D.

Worm gear D drives a series of other gears and bevel gears—similarly to those described in the transmission unit in Section VI above—to rotate a drive shaft of generator C in one direction. The drive shaft is supported inside the collection unit with supports F. Power generated from generator C is then fed through cable E down the articulating shaft B where it becomes available for storage or transmission, as determined by the specific application of the device.

Figure 17:
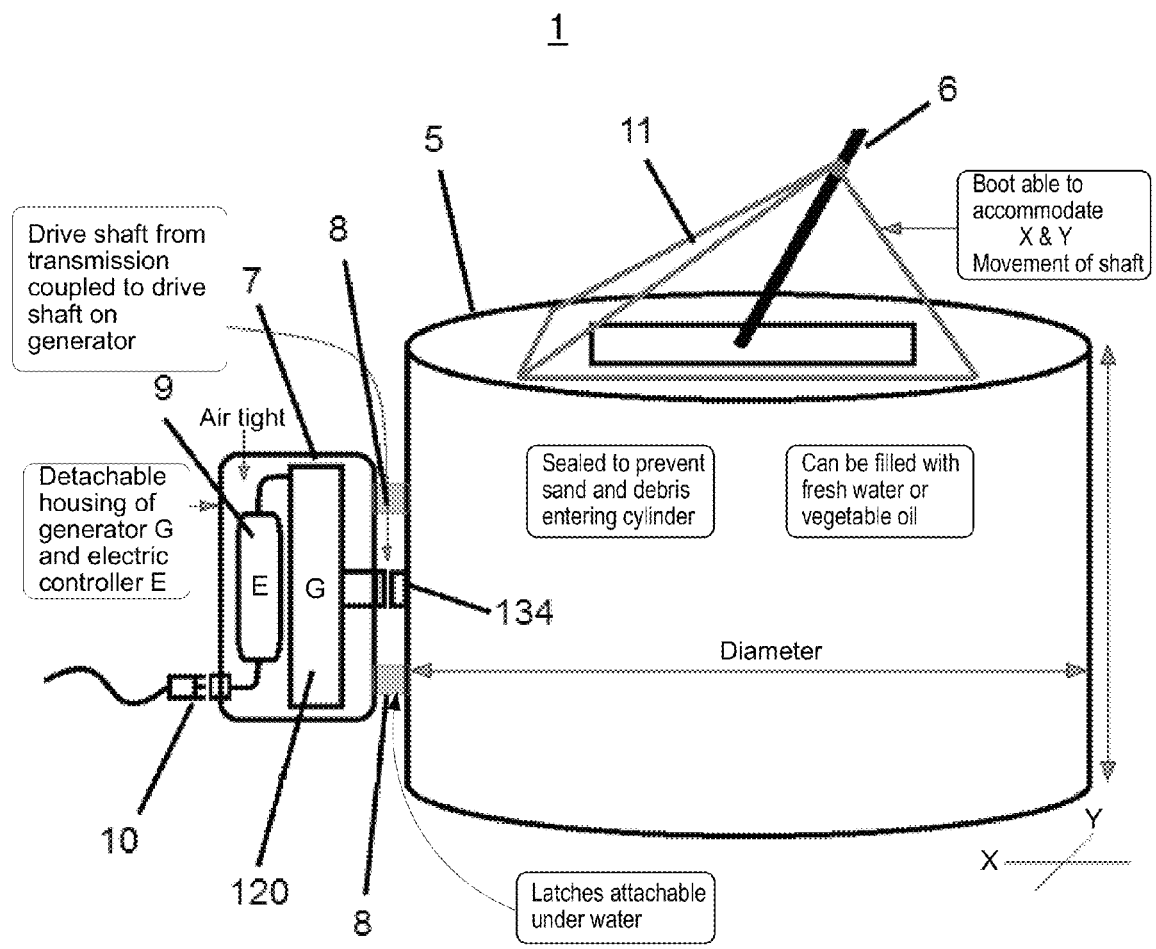
FIG. 17 illustrates one embodiment of a transmission and generator unit capable of collecting kinetic movement and transforming it into electricity, according to one embodiment of the invention.

Finally, FIG. 17 illustrates one embodiment of the overall device 1 with the transmission unit 5 connected with the articulating arm 6 and a power generation unit 7 positioned adjacent to the transmission unit and connected with the transmission unit through the drive shaft 134 (solid or magnetic couplings may be used). In this embodiment, the power generation unit 7 may be secured to the transmission unit 5 via one or more latches 8. The power generation unit 7 includes the generator 120 which is in geared connection with the drive shaft 134 and which generates an electrical charge that is then transmitted to an electrical controller 9, which regulates the electricity that is then transmitted through a power cable 10 to an external source.

The embodiment in FIG. 17 also illustrates a boot 11 which provides structural support to the articulating arm 6 via the housing of the transmission unit 5, while still allowing the articulating arm 6 to move in multiple directions. Furthermore, the transmission unit 5 may be sealed to prevent debris, liquid or other particulates from entering the chamber and damaging or wearing on the gears and other mechanisms, and in one embodiment may be filled with water or an oil such as vegetable oil or mineral oil. In an underwater application, filling the transmission unit with a mineral oil with a weight heavier than water will allow the mineral oil to remain within the chamber of the transmission unit and remain within the portion of the chamber involving the moving components even if water leakage occurs.

The invention claimed is:

1. An apparatus for converting kinetic movement to electrical power, comprising:
    a collection unit configured to capture randomized kinetic energy from an extrinsic source;
    an articulating arm connected with the collection unit to translate the randomized kinetic energy into axial movement;
    a lever arm positioned between the articulating arm and the collection unit, wherein the lever arm is divided into an upper lever arm and lower lever arm at a pivot point, wherein the upper lever arm moves in a first direction and the lower lever arm moves in an opposing direction such that the articulating arm is moved in a third direction perpendicular to the movement of the lever arm;
    a transmission unit in geared connection with the articulating arm to transform the axial movement of the articulating arm through a set of pinion gears and one way bearings separately attached to different portions of a drive shaft and configured to rotate in opposite directions to translate axial movement in different directions into unidirectional rotation of a drive shaft, wherein the transmission unit translates linear movement of the articulating arm from up to two axes of direction into the unidirectional rotation; and
    an electrical generation unit in geared connection with the drive shaft to generate an electrical charge from the unidirectional movement of the drive shaft.

2. The apparatus of claim 1, wherein the transmission unit converts the bi-directional movement of the articulating arm into unidirectional torque through a geared connection of pinion gears connected with the articulating arm.

3. The apparatus of claim 2, wherein the transmission unit converts the unidirectional torque into rotation of a drive shaft.

4. The apparatus of claim 3, wherein the set of one way bearings are positioned in opposite directions to translate movement of the articulating arm in two directions into the unidirectional rotation of the drive shaft.

5. The apparatus of claim 1, wherein the collection unit is a tesseract.

6. The apparatus of claim 1, wherein the randomized kinetic energy from an extrinsic source is produced from movement of a liquid.

7. The apparatus of claim 1, wherein the randomized kinetic energy from an extrinsic source is produced by movements of air.

8. The apparatus of claim 1, wherein a length of the upper lever arm is greater than a length of the lower lever arm.

9. The apparatus of claim 1, wherein the upper lever arm and lower lever arm move in an x-y axis and cause the articulating arm to move in a z-axis.

10. The apparatus of claim 1, wherein the articulating arm is divided into two parallel sections, where a first section interfaces with a first pinion gear configured to rotate in a first direction, and a second section interfaces with a second pinion gear configured to rotate in a second, opposing direction.

11. The apparatus of claim 10, wherein the first pinion gear and second pinion gear each interface with a separate shaft and separate one way bearing to rotate a first gear and a second gear that is connected with a third gear which rotates the drive shaft.

12. The apparatus of claim 11, wherein the first gear and second gear rotate in opposite directions to simultaneously rotate the third gear in a single direction.

13. The apparatus of claim 11, wherein the first gear and second gear are connected with an idler gear on an opposite end of the interaction between the first gear, second gear and third gear to support the transmission of the rotational movement of the first gear and second gear to the third gear.

14. The apparatus of claim 1, wherein the articulating arm interfaces with a first shaft separated at a middle portion into opposing ends which rotate in opposing directions via one way bearings, wherein the first shaft is in geared connection at its opposing ends with a second shaft separated into opposing ends via a first gear and a second gear which communicate to rotate a third gear connected with the drive shaft.

* * * * *